US006186085B1

United States Patent
Kato et al.

(10) Patent No.: US 6,186,085 B1
(45) Date of Patent: Feb. 13, 2001

(54) METHOD FOR REDUCING FRICTIONAL RESISTANCE OF HULL, FRICTIONAL RESISTANCE REDUCING SHIP USING SUCH METHOD, AND METHOD FOR ANALYZING EJECTED AIR-BUBBLES FROM SHIP

(75) Inventors: Hiroharu Kato, 5-31-9, Koganehara, Matsudo-shi, Chiba- Ken; Yoshiaki Takahashi, Tokyo; Yuki Yoshida, Kawasaki; Akira Masuko, Kamakura; Osamu Watanabe, Yokohama, all of (JP)

(73) Assignees: Hiroharu Kato, Chiba-ken (JP); Ishikawajima-Harima Heavy Industries Co., Ltd., Tokyo (JP)

( * ) Notice: Under 35 U.S.C. 154(b), the term of this patent shall be extended for 0 days.

(21) Appl. No.: 09/068,844

(22) PCT Filed: Dec. 3, 1996

(86) PCT No.: PCT/JP96/03526

§ 371 Date: May 15, 1998

§ 102(e) Date: May 15, 1998

(87) PCT Pub. No.: WO97/20728

PCT Pub. Date: Jun. 12, 1997

(30) Foreign Application Priority Data

Dec. 4, 1995 (JP) .................................................. 7-337723
Dec. 4, 1995 (JP) .................................................. 7-337724
Dec. 28, 1995 (JP) .................................................. 7-354449
Feb. 2, 1996 (JP) .................................................. 8-039140
Jun. 6, 1996 (JP) .................................................. 8-144646
Jul. 26, 1996 (WO) ................................... PCT/JP96/02101

(51) Int. Cl.$^7$ ...................................................... B63B 1/34

(52) U.S. Cl. ........................................................ 114/67 A

(58) Field of Search ................................. 114/67 R, 67 A

(56) References Cited

U.S. PATENT DOCUMENTS 4,693,746  9/1987  Nakai et al. .
5,575,232 * 11/1996 Kato et al. ........................ 114/67 A

FOREIGN PATENT DOCUMENTS

| 0 280 456 | 8/1988 | (EP) . |
| 59-170094 | 11/1984 | (JP) . |
| 62-268793 | 11/1987 | (JP) . |
| 2-500014 | 1/1990 | (JP) . |
| 62-102797 | 1/1990 | (JP) . |
| 4-177140 | 6/1992 | (JP) . |
| 7-156859 | 6/1995 | (JP) . |
| 7-40391 | 7/1995 | (JP) . |
| WO 88/06547 | 9/1988 | (WO) . |

OTHER PUBLICATIONS

Journal of The Society of Naval Architects of Japan, vol. 148, Dec. 1980, pp. 24–32, (included is a partial English translation).

* cited by examiner

*Primary Examiner*—Jesus D. Sotelo
(74) *Attorney, Agent, or Firm*—Pearne & Gordon LLP

(57) ABSTRACT

A method for reducing frictional-resistance at a hull (2) of a ship (1), characterized in that the method comprising a step of ejecting micro-bubbles (8) having predetermined diameters; wherein the micro-bubbles (8) are ejected into water from a position adjacent to the starting point of desired stream line (F.L.) of water and from the position where the static pressure is low; the stream line (F.L.) being directed, from the submerged shallow position at a stem portion (4) of the ship's hull (2), to the ship's bottom (5) along both side surfaces of the ship's hull (2), so that the ejected micro-bubbles (8) are transferred to the ship's bottom (5) along the stream line (F.L.); whereby the micro-bubbles (8) are distributed at at least a part of the circumferential area of the submerged portion of the hull (2), thus reducing frictional-resistance at a hull (2) of a ship (1) while cruising.

14 Claims, 24 Drawing Sheets

Result of Tracking
Air Bubbles (Average)

Loci of Air Bubbles using
Air-Bubble-Covering-State-Assumptive Code

Coordinate System for Formulation

Turbulent-Flow Shear Force Reduction Model

Coordinate System
in Cavitation Water Channel

Calculated Value of Taylor's Scale Squared and Distance form Wall (with no air bubbles)

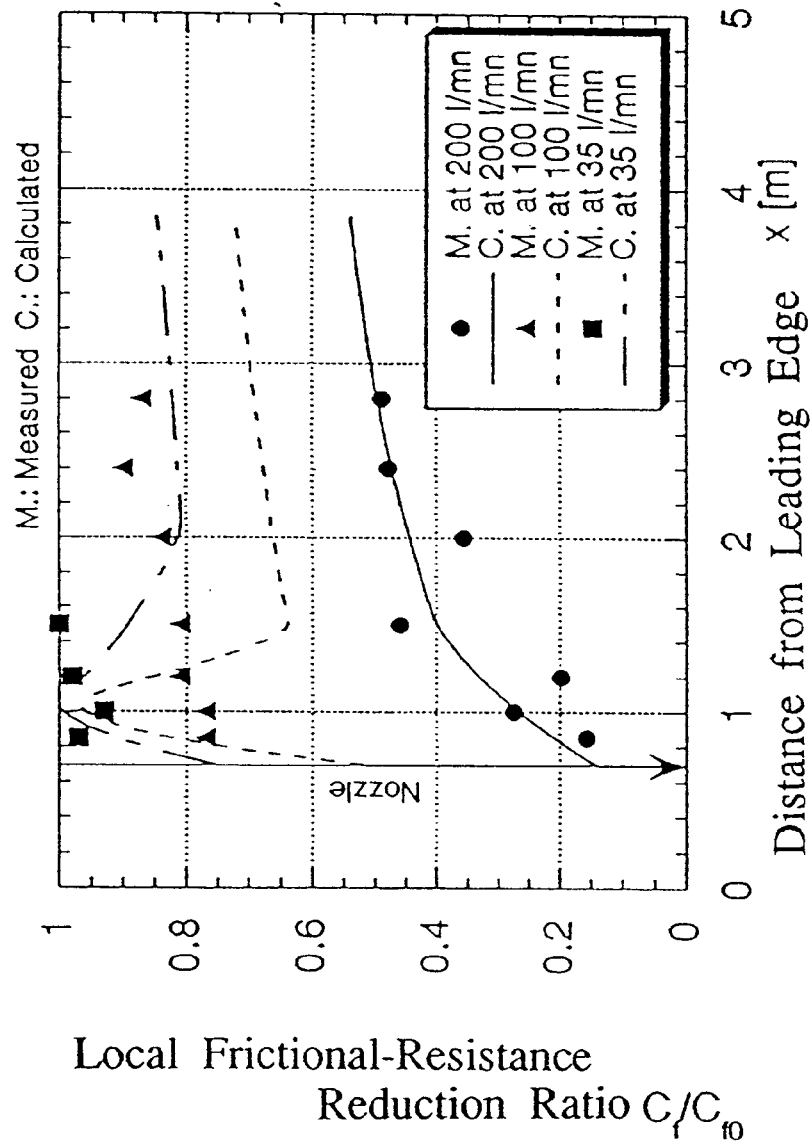

Side View

Oblique View of Portside Bottom from Below

Distribution of Void Zone at S.S.– 9.8

Distribution of Void Zone at S.S.– 9.2

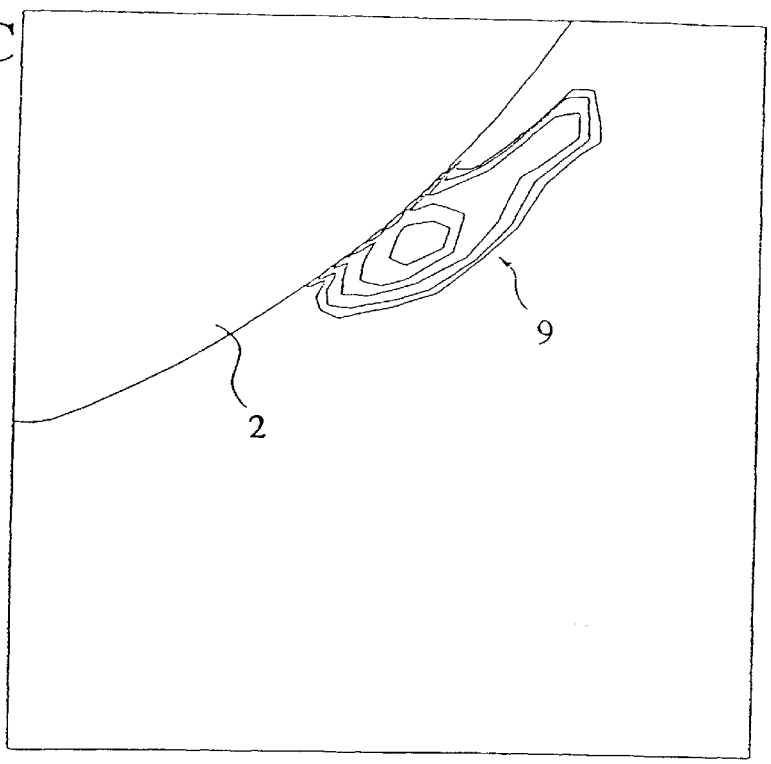
Distribution of Void Zone at S.S.−8.0
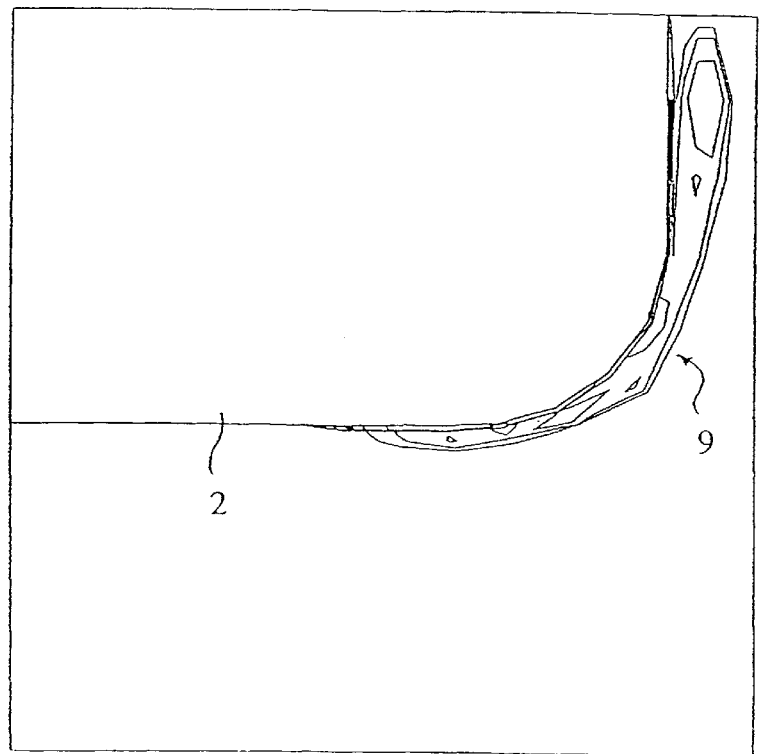
Distribution of Void Zone at S.S.−5.8

Distribution of Void Zone at S.S.–2.8

Distribution of Void Zone at S.S.–1.3

Distribution of Void Zone at S.S.– 0.6

Distribution of Void Zone at S.S.– 0.2

Fig. 23

| Main Flow Velocity [m/s] | Air Ejecting Velocity [m/s] | | | | | | |
|---|---|---|---|---|---|---|---|
| | 0.65 | 1.3 | 1.95 | 3.25 | 6.5 | 9.75 | 13 |
| 5 | 3 | 2.9 | 3 | 1.8 | — | — | 1.5 |
| 8 | 1 | 0.9 | 0.9 | 1.1 | 1.3 | 1 | 1.1 |
| 12 | 1 | 0.9 | 0.9 | 1 | 1 | 0.6 | 0.7 |

METHOD FOR REDUCING FRICTIONAL RESISTANCE OF HULL, FRICTIONAL RESISTANCE REDUCING SHIP USING SUCH METHOD, AND METHOD FOR ANALYZING EJECTED AIR-BUBBLES FROM SHIP

TECHNICAL FIELD

The present invention relates to a method for reducing the frictional-resistance of a ship's hull, in which micro-air-bubbles are injected into the boundary layer of the submerged portion of the ship's hull to reduce the frictional-resistance affecting the hull's surface; to a frictional-resistance reducing ship using such method; and to a method for analyzing air-bubbles ejected from the ship.

BACKGROUND ART

When a ship is cruising, a boundary layer of water (or sea water) is produced around the hull of the ship due to the viscosity of the water that is a fluid. The flow velocity of the water at the boundary layer with respect to the ship's hull is zero at the hull's surface and tends to increase rapidly as the distance from the hull's surface increases. This is one of the most important causes of the hull resistance since the frictional-resistance of water affects the ship's hull.

Thus, in recent years, research has been pursued for improving the propelling performance of a ship by reducing the frictional-resistance affecting the ship's hull. One possible countermeasure being studied is the micro-bubble-propelling method in which air bubbles are injected from the hull's surface into the boundary layer of the submerged portion of the ship's hull to reduce the frictional-resistance affecting the hull's surface by covering the submerged portion of the ship's hull with air bubbles.

As a means for embodying such a propelling method employing air bubbles, it is known to eject pressurized air, generated by an air supplying device such as an air pump, into water, from a ship's outer surface so as to distribute the air bubbles around the hull.

A method for producing air bubbles in water is also known in which, for example, pressurized air is ejected from a nozzle, a slit formed in a ship's hull, or an air conduit (such as a pipe perforated with a plurality of holes).

However, in such a conventional technique for generating air bubbles by ejecting pressurized air simply at the periphery of the ship's hull, the air ejection ports should be formed everywhere at the periphery of the ship's hull so as to cover as wide an area of the hull as possible with air bubbles; alternatively, the air ejection ports should be formed at least over the entire area from the upper portion to the lower portion of the submerged portion of the hull in order to cover the submerged portion of the hull from the shallower area to the deeper area. As a result of this, static head at the air ejection portion is relatively high, and thus, the energy consumption for ejecting the pressurized air is large, offsetting the saving of cruising energy from the reduction of frictional-resistance.

Furthermore, the conventional method in which air is ejected from the known nozzle, slit, or air conduit (such as a pipe perforated with holes) could not produce micro-air-bubbles having very small diameters. Consequently, it was not possible to effectively hold the bubbles in the boundary layer surrounding the ship's hull, and thus, effective frictional-resistance-reducing effects could not be obtained. Alternatively, in order to avoid producing such problems, it was necessary to provide air ejection portions over nearly the entire periphery of the hull so as to cover as wide an area of the hull as possible with air bubbles, thus requiring large amounts of energy for ejecting the air.

There are also several reports of research regarding the behavior of air-bubbles used for reducing the frictional-resistance of a navigating body. For example, Madavan, et al., studied a direct model of frictional-resistance reduction, using a model in which the apparent local density and the local coefficient of viscosity, which vary due to the presence of air bubbles in the liquid phase, are used as parameters of the mixing-length theory (Madavan J L, Merkle C L, Deutsch S; 1985; "Numerical Investigation into the Mechanisms of Microbubble Drag Reduction"; Trans ASME; vol.107, p370–377). Marie proposed a model in which the thickness of a viscous sublayer varies because of the presence of air bubbles, using the apparent local density and the local coefficient of viscosity similar to the model of Madavan (Marie J L; 1987; "A Simple Analytical Formulation for Microbubble Drag Reduction" Physico Chemical Hydrodynamics; vol. 8-2, p213–220). However, taking into account the fact that the apparent local coefficient of viscosity used by Madavan, et al., and by Marie employs Einstein's model, the models seem to be more appropriate for the case of analyzing a medium, referred to as a "suspension", in which particles finer than two-phase flow are dispersed. The size of the suspension is generally 0.01–100 $\mu$m. It should be further examined whether Einstein's model is applicable to the flow containing air bubbles having diameters of approximately 1 mm (which will be discussed in the present invention). Furthermore, since these theoretical investigations do not discuss the assumption about the void fraction, these theories do not appear to be realistic. Thus, problems relating to the determination of the amount of air bubbles to be ejected or relating to effective use of the ejected air bubbles remain in these techniques, the problems resulting from the difficulties in exactly understanding the behavior of air bubbles ejected into a water stream.

Therefore, a primary object of the present invention is to provide a method for reducing the frictional-resistance of a ship's hull in which effective reduction in frictional-resistance of the hull can be surely realized and to provide a frictional-resistance reducing ship using such method.

Another object of the present invention is to provide a method and an apparatus which can surely produce the micro-air-bubbles required for carrying out the present invention.

Still another object of the present invention is to provide a frictional-resistance reducing ship which can substantively eliminate the need for an air-bubble-generating device by utilizing micro-bubbles contained in stem-broken-waves produced at the stem portion of a ship during cruising.

Still another object of the present invention is to provide a method for analyzing the behavior of ejected air bubbles, which is required to embody the method for reducing the frictional-resistance, this object including the following concrete objects:

clarifying the behavior of air bubbles in a water stream;

improving the understanding of the distribution, feed amount, and amount of presence of air bubbles in the boundary layer;

making it possible to calculate the frictional-resistance reduction effect due to the supply of air bubbles into the boundary layer; and making it possible to calculate the supplying position and the supplying amount of air bubbles in response to the hull form, thus improving the cost-benefit ratio of the expenditure of energy of the frictional-resistance reduction ship due to the ejection of air bubbles.

DISCLOSURE OF INVENTION

In order to accomplish these objects, the present invention provides:

a method for reducing frictional-resistance at a hull of a ship, characterized in that: the method comprising a step of ejecting micro-bubbles each having a predetermined diameter; wherein the micro-bubbles are ejected into water from a position adjacent to the starting point of a desired stream line of water and from a position at which the static pressure is low; the stream line being directed from the submerged shallow position at a stem portion of the ship's hull to the ship's bottom along both side surfaces of the ship's hull, so that the ejected micro-bubbles are carried toward the ship's bottom along the stream line; whereby the micro-bubbles are distributed at at least a part of the circumferential area of the submerged portion of the hull, thus reducing frictional-resistance at a hull of a ship while cruising.

It is known that during cruising, at the submerged portion of a ship's hull, there are produced constant stream lines of water. These stream lines extend from the stem portion to the stern of the ship's hull. However, the stream lines do not only flow linearly and horizontally. The curve of each of the stream lines (i.e., the line along which the stream line flows) is determined as a function of the shape and the cruising speed of the hull. Furthermore, even if both the shape and the cruising speed of the hull are constant, the curves vary in response to the level (height) at which the stream line exists with respect to the submerged portion of the hull. For example, there exists, on one hand, a stream line which flows horizontally adjacent to the water surface consistently from stem to stern, and on the other hand, a stream line which reaches the ship's bottom by being shifted toward the deeper direction during the transference from stem to stern.

The primary features of the present invention have been constituted, in particular, based on the following findings: i) some stream lines move along the hull to the lower portion of the hull including the bottom as they travel from the stem to the stern, and ii) some of these stream lines may possibly pass by a shallow point of the submerged portion of the stem of the hull; thus micro-air-bubbles can be carried by the stream lines and be distributed in the circumference of the submerged portion of the hull by ejecting micro-air-bubbles from an adjacent point to the starting point of the stream lines, whereby the effective frictional-resistance reduction can be realized. The air ejection port can be provided only at the stem area. Moreover, since the ejection port is provided at a position where the static pressure is low, a very small amount of energy for ejecting air is required.

In the present invention, it is preferable to eject the micro-air-bubbles from an area which is a) between 8.5 and 10 of the square station in the fore-aft direction of the hull, and b) within a depth of ⅔ of the draft line in the submerged portion of the hull. First, the reason for b) above is that when air is ejected from a point deeper than that as stated above, more energy is required due to the increase of static head at the ejection port, thus possibly offsetting the propulsion energy saved due to the reduction of frictional-resistance by the ejected air. The reason for a) is that if the air ejection port is located in an area other than that as stated above, the ejection port must be disposed over a wide area in order to widely cover the ship's hull with air bubbles, and thus, ultimately, requires the ejection port to be disposed at the position where the static head is high. Here, in the present specification, the phrase "the point at which static pressure is low" does not mean "the point where the draft is shallow" (note that when the draft is shallow, the static head of is course relatively low), and does mean the point where the static pressure thereat is smaller than the static head caused by the draft, due to the fast flow of water.

In the present invention, preferably, the average diameter of the micro-air-bubbles is approximately 1 mm. If the size of the air bubbles is much larger than this, the air bubbles may float for a short time outside the stream line due to great buoyancy, thus preventing coverage of the hull. Conversely, if the size of the air bubbles is much smaller than the above, the air bubbles may diffuse over a wide area, and thus, there is the possibility that the required void fraction in the circumference of the hull cannot be obtained.

When the method according to the present invention is used, it is preferable to eject pressurized air through pores to generate micro-air-bubbles. The pores may be formed on an outer skin of the hull, or a porous plate may be integrated with or fixed to the outer skin. Furthermore, preferably, the pores are arranged at pitches of 2.5–5 times the diameter of the pores. In particular, it is preferable, in order to obtain micro-air-bubbles having an average diameter of about 1 mm, to eject air through pores each having a diameter of 2 mm and arranged at pitches of 5 mm into water whose main flow velocity is over 8 m/second. Here, the term "main flow velocity" refers to water flow velocity relative to the hull, and this is generally understandable as a cruising speed of a ship.

In accordance with the inventors' research, it has been found that when micro-air-bubbles are produced in water by ejecting air through pores as above, the size of the micro-bubbles vary as functions of both the air ejecting speed and the relative water flow velocity (i.e., the navigating speed of ship which is usually referred to as the "main flow velocity" in the laboratory). Accordingly, in the present invention, the air ejecting speed may be varied in response to the cruising speed of the ship in order to maintain optimum air bubble size regardless of the cruising speed. This is another feature of the present invention.

The stream lines also vary as a function of the ship's speed. Accordingly, in the present invention, a micro-air-bubble ejection port may include a plurality of areas in the fore-aft direction of the hull, and each of the areas to be used can be selected by, for example, operating a flow control valve. This makes it possible to reliably introduce the micro-air-bubbles into the desired stream line even if the stream line changes position due to a change in the ship's speed.

Moreover, the micro-air-bubble ejection port may include a plurality of areas in the fore-aft directions of the hull, and each of the areas to be used can be selected. This leads to exact compensation for changes in the stream line.

In another aspect of the present invention, a wave conduit for taking in a stem-broken-wave is formed at either side of the submerged portion of the hull in the stem portion, the wave conduit being also located corresponding to the stream line of water and at the position where the static pressure is low. The wave conduit is formed, for example, in a tubular shape, and comprises 1) an intake, open adjacent to the stem portion adjacent to the water surface while cruising, for taking in the stem-broken-wave produced at the stem portion, and 2) a discharge opening, open at the rear of and slightly below the intake, for discharging the stem-broken-wave which was taken in. As such, the wave conduit is downwardly and obliquely oriented so as to direct the stem-broken-wave taken in to the flow direction of the stream line in order to place the stem-broken-wave on the stream line. Some portion of the bubbles produced at the stem portion while cruising may thereby be trapped by the wave conduit. The wave conduit thereby conducts air bubbles including micro-air-bubbles. When the water containing micro-air-bubbles trapped by the wave conduit is discharged from the discharge opening, the discharged water (i.e., containing micro-air-bubbles therein) may be carried by the flow line and distributed to the desired area surrounding the hull.

Furthermore, it is also possible to provide an air supplying opening in the wave conduit, to discharge air into the wave conduit via the air supplying opening, and to eject the stem-broken-wave in the direction to the stream line by the pressurized air. Advantageously, the axis of the supplying opening is inclined toward the direction of the discharge opening.

Moreover, in order to analyze the behavior of air bubbles ejected from the submerged surface of a ship into a water stream, the method such as that described below may be applied. The method comprises:

a step of ejecting air bubbles into the boundary layer between the submerged surface and the water stream and/or into the water adjacent to the submerged surface;

a step of obtaining the number of air bubbles existing in each analyzing element constituting a plurality of analyzing elements;

a step of obtaining the number of air bubbles transferred by diffusion to the analyzing elements adjacent to each of the analyzing elements;

steps of repeating the above steps, each repeat step being done by changing an air-bubble ejecting point; and a step of calculating the distribution of air bubbles with respect to each of the analyzing elements.

When carrying out the above method, the following approaches may be adopted:

integrating the number of the air bubbles with respect to one of the analyzing elements, and calculating the void fraction using the number and the volume of the air bubbles and the capacity of the analyzing element;

calculating the void fraction using different air-bubble diameters; and giving the diffusion of the air bubbles around the submerged surface of the hull and in the stream line, using random numbers, and calculating the distribution of the air bubbles with respect to the analyzing elements.

In addition, the displacement of a single air bubble was obtained by using the following equations of motion (1)–(3): (Here, $m_b$ is the mass of a single air bubble (kg); $m_A$ is the additional mass of a single air bubble (kg); each of X, Y, and Z is the displacement of an air bubble (m); $\mu$ is coefficient of viscosity (pa·s); $d_b$ is the diameter of the air bubble (m, $\mu$m); each of $\bar{u}$, $\bar{v}$, and $\bar{w}$ is time-average of flow velocity (m/s); each of u', v', and w', respectively is turbulence flow velocity (m/s); $\rho$ is density (kg/m$^3$); $\nu$ is the dynamic coefficient of viscosity (m$^2$/s); V is the volume of a single air bubble (m$^3$); P is the absolute pressure (pa); each of Nx, Ny, and Nz, respectively, is the vertical reaction force impinging on the air bubble when it exists on a wall surface (N); g is gravitational acceleration (m/s$^2$); and the symbols with subscript 'L' mean that the object indicated by the symbol is liquid.)

$$(m_b + m_A)\ddot{X} = 6\pi\mu_L(d_b/2)(\bar{u}_L + u'_L - \dot{X}) + 6.46\rho_L(d_b/2)^2 v_L^{\frac{1}{2}} \quad (1)$$

$$\left\{(\bar{v}_L + v'_L - \dot{Y})\left(\frac{\partial \bar{u}_L}{\partial x}\right)^{\frac{1}{2}} + (\bar{w}_L + w'_L - \dot{Z})\left(\frac{\partial \bar{w}_L}{\partial x}\right)^{\frac{1}{2}}\right\} - V\frac{\partial P}{\partial x} + N_x$$

$$(m_b + m_A)\ddot{Y} = 6\pi\mu_L(d_b/2)(\bar{v}_L + v'_L - \dot{Y}) + 6.46\rho_L(d_b/2)^2 \quad (2)$$

$$v_L^{\frac{1}{2}}\left\{(\bar{w}_L + w'_L - \dot{Z})\left(\frac{\partial \bar{w}_L}{\partial y}\right)^{\frac{1}{2}} + (\bar{u}_L + u'_L - \dot{X})\left(\frac{\partial \bar{u}_L}{\partial y}\right)^{\frac{1}{2}}\right\} -$$

$$V\frac{\partial P}{\partial z} + N_y - \rho_L gV + m_b g$$

$$(m_b + m_A)\ddot{Z} = 6\pi\mu_L(d_b/2)(\bar{w}_L + w'_L - \dot{Z}) + 6.46\rho_L(d_b/2)^2 v_L^{\frac{1}{2}} \quad (3)$$

$$\left\{(\bar{u}_L + u'_L - \dot{X})\left(\frac{\partial \bar{u}_L}{\partial z}\right)^{\frac{1}{2}} + (\bar{v}_L + v'_L - \dot{Y})\left(\frac{\partial \bar{v}_L}{\partial z}\right)^{\frac{1}{2}}\right\} - V\frac{\partial P}{\partial z} + N_z$$

In addition to equations (1)–(3), the void fraction in a desired analyzing element may be obtained using the following equations (4)–(10): (Here, $q'_L{}^{(i)}$ is turbulence flow velocity at i-step (m/s); each of $x_s$, $y_s$, and $z_s$, respectively, is random point on a unit sphere; $T_{*L}$ is the integral time scale in the liquid phase (s); $\epsilon_L$ is the energy dissipation modulus of the liquid phase (m$^2$/s$^3$); $\Delta t$ is sampling period (s); $k_L$ is the turbulence energy of the liquid phase (m$^2$/s$^2$); X is a constant defined by equation (10); $\sigma$ is standard deviation of the turbulence flow velocity defined by equation (10) (m/s); and $\gamma$ is a normal random number.)

$$\left.\begin{array}{l}\frac{dy}{dx} = \frac{\dot{Y}}{\dot{X}} \\ \frac{dz}{dy} = \frac{\dot{Z}}{\dot{Y}}\end{array}\right\} \quad (4)$$

$$PV = \text{const.} \quad (5)$$

$$\left.\begin{array}{l}u'_L = q_L''^{(i)} x_s \\ v'_L = q_L''^{(i)} y_s \\ w'_L = q_L''^{(i)} z_s\end{array}\right\} \quad (6)$$

$$T_{*L} = \frac{3k_L}{\varepsilon_L} \quad (7)$$

$$\chi = e^{-\frac{\Delta t}{T_{*L}}} \quad (8)$$

$$\sigma = \sqrt{2k_L(1-\chi^2)} \quad (9)$$

$$q'_L{}^{(i)} = \chi q'_L{}^{(i-1)} + \sigma\gamma \quad (10)$$

The analyzing method in accordance with the present invention has been accomplished by showing, using a practical two-phase flow model, the phenomenon in which the frictional-resistance of a navigating body is reduced by feeding micro-air-bubbles into a turbulent boundary layer and then theoretically verifying the frictional-resistance-reducing mechanism. The air bubble model is a Lagrangian model based on the equations of motion of a single air bubble; the void fraction distribution and the local behaviors of air bubbles are approximated by using random motions of an air bubble in an initially-given three-dimensional turbulent flow field with no air bubbles. The liquid phase model is based on mixing-length models; the equations, showing a reduced amount of turbulent shear force, were created by assuming that the force from an air bubble is identical to the fluid reaction of an air bubble caused by slip.

Using the analyzing method for air bubbles ejected from a ship's hull in accordance with the present invention, the following advantages can be obtained:

It is possible to facilitate analysis of the frictional-resistance-reduction-mechanism of a ship by air bubbles, by accurately understanding the flow and the distribution of air bubbles in a water stream by obtaining, in view of the diffusion phenomena of air bubbles, the number of air bubbles passing through the analyzing elements;

By obtaining the void fraction from the integration of the number of air bubbles in the analyzing element and the volume rate of the air bubbles, and by obtaining the relationship between the feeding area of air bubbles at the boundary layer and/or the void fraction and the frictional-resistance reducing effect of a ship, it is possible to adapt the analyzing method to a real ship;

It is possible to easily obtain the distribution and the void fraction of air bubbles using a computer, by taking into account the diffusion phenomena of air bubbles with respect to the stream line near the submerged surface of the ship's hull;

By accurately understanding the behavior of air bubbles in a water stream by making use of equations of motion (1)–(3), it is possible to effectively feed air bubbles to the area where frictional-resistance reduction can be certainly achieved;

It is possible, due to the analyzing equations, to easily obtain the void fraction at a desired submerged surface and a desired analyzing element, and to improve the revenue and expenditure in energy of the frictional-resistance reduction ship; and It is possible, even if the configuration of a ship changes, to obtain the air-bubble feeding amount, the void fraction, and air-bubble feeding area, by taking into account the stream line and the distribution, thus making it possible to effectively provide air bubbles in accordance with the configuration of the ship's hull.

Some preferred embodiments of the present invention will be described hereinafter with reference to the appended drawings.

BRIEF DESCRIPTION OF DRAWINGS

FIG. 16 is a graph showing the relationship of the local-frictional-resistance-reduction ratio;

FIGS. 18A through 18H each respectively shows a partial sectional view of a ship's hull at the area of S.S.-0.2 through S.S.-9.8 shown in FIG. 17A, respectively showing a state of distribution of micro-air-bubbles carried by the stream line;

FIG. 23 is a table showing the changes of the sizes of the micro-air-bubbles in the case in which the air ejecting speed and the main flow velocity (cruising velocity) are changed, when ejecting pressurized air through the porous plate according to the present invention;

FIG. 26A shows a partial sectional side view;

FIG. 26B shows a partial elongated view of FIG. 26A;

FIG. 26C shows a sectional view taken along the line A—A in FIG. 26B;

FIG. 26D shows a sectional view taken along the line B—B in FIG. 26B; and

FIG. 26E is a sectional view taken along the line C—C in FIG. 26B;

FIG. 27A shows a sectional view, and

FIG. 27B shows a partial plan view; and

FIG. 28A shows a partial plan view of the frictional-resistance reducing ship; and FIG. 28B shows a perspective view of the wave conduit for taking in a stem-broken-wave and air pipes connected therewith.

BEST MODE FOR CARRYING OUT THE INVENTION

Figure 1:
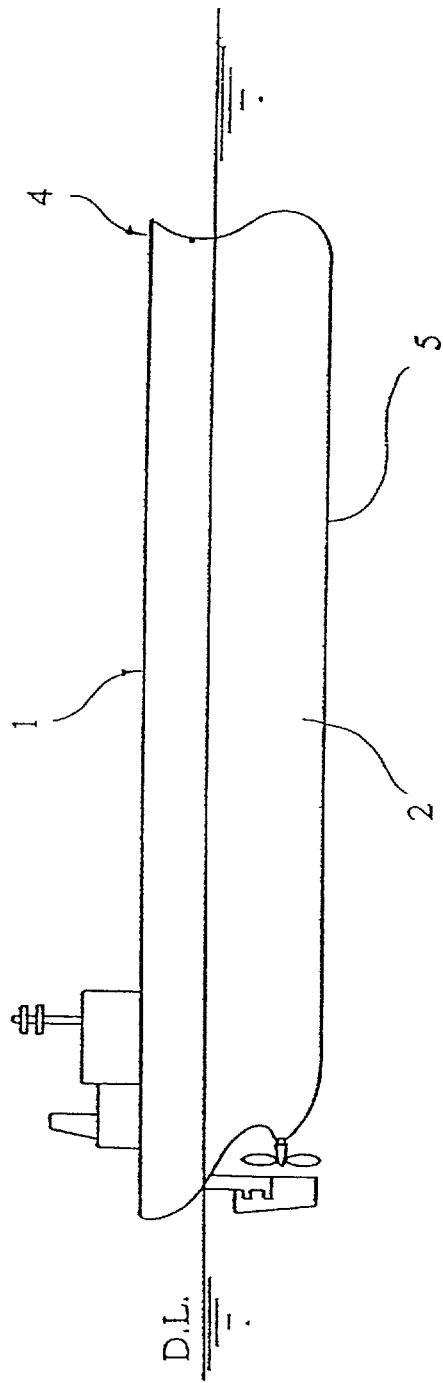
FIG. 1 shows a side view of an example of a ship in which the present invention is employed.
Figure 2:
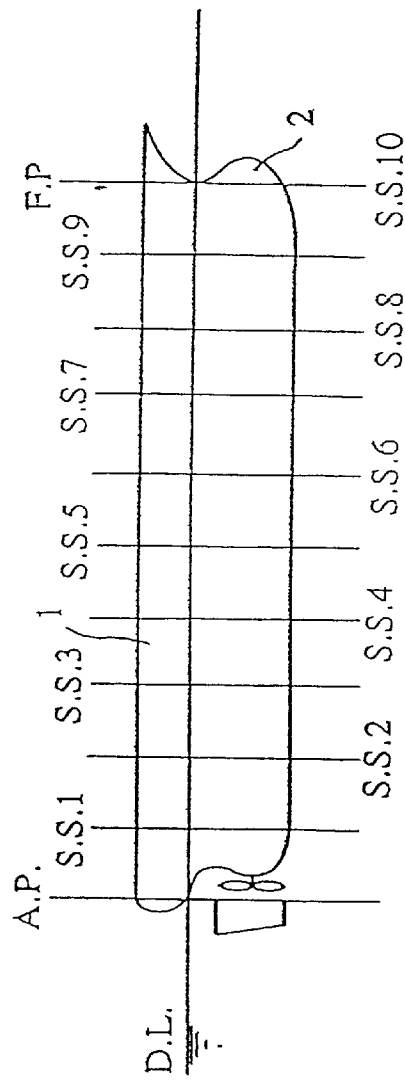
FIG. 2 shows divisional lines for dividing the ship into a plurality of square stations along the fore-aft directions.

FIG. 1 shows a schematic view of an example of a ship (frictional-resistance reducing ship) 1 to which the present invention is adapted. The ship 1 comprises a hull 2, and the ship 1 will be explained in the embodiment as a container ship, for example. FIG. 2 schematically shows only the hull 2 of the ship 1 shown in FIG. 1, and the reference "D.L." indicates a water surface, that is, the draft line of the hull 2. In FIG. 2, in the plurality of parallel lines, the left-most line shows the aft perpendicular A.P.; the right-most line shows the fore perpendicular F.P.; and the zone between the aft perpendicular A.P. and the fore perpendicular F.P. is equally divided, for the sake of convenience, into ten square stations, that is, square station S.S.-1 through S.S.-10.

The essential feature of the present invention is to eject micro-bubbles having predetermined diameters into water from the position adjacent to the starting point of a stream line of water and from the position where the static pressure is low, the stream line being directed to the ship's bottom along the surfaces of both sides of the ship's hull from the submerged shallow position at a stem portion of the ship's hull, so that the ejected micro-bubbles are transferred to the ship's bottom along the stream line, whereby the micro-bubbles are distributed at at least a part of the circumferential area of the submerged portion of the hull, thus reducing frictional-resistance at the hull of the ship while cruising.

Figure 3:
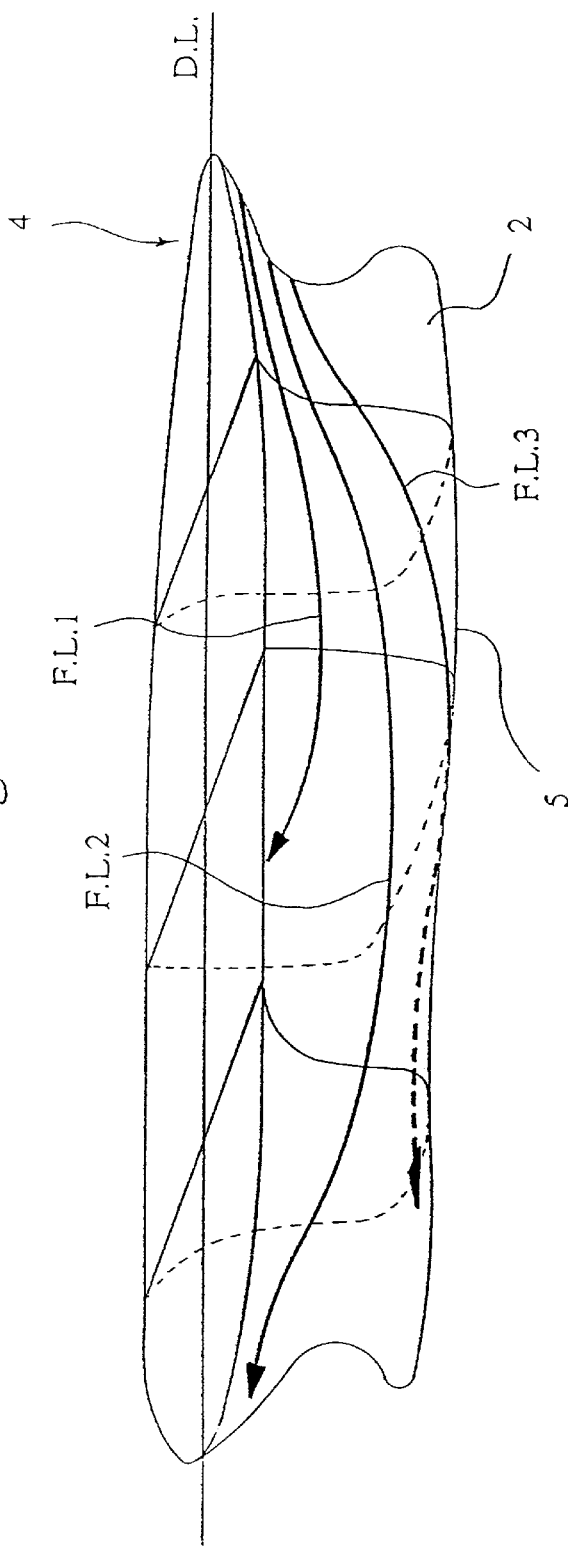
FIG. 3 shows a schematic perspective view of the submerged portion of the ship's hull below the draft line D.L., shown with stream lines in accordance with the present invention.

FIG. 3 shows a perspective view, from a viewpoint oblique and aft of the right side, of the hull 2, lower than the draft line D.L. F.L. 1–3 are representative stream lines of water produced along the hull 2 while cruising. As such, the stream lines flow from the stem portion 4 to the stern of the hull 2. However, among the stream lines, there is one which flows adjacent to the water surface (F.L. 1), one which flows obliquely downward along the hull 2 up to halfway and then floats as it extends astern (F.L. 2), and one which goes under the ship's bottom (F.L. 3), as shown in FIG. 3. The three stream lines shown are representative examples, and there are of course other stream lines among the stream lines F.L. 1–3.

The present invention was attained by noting the presence of the stream lines as above. Thus, the present invention is one in which micro-air-bubbles produced adjacent to the stem portion 4 are carried by the stream line which, in particular, goes in the directions toward the sides and the ship bottom 5 of the hull 2 along the hull 2, just as F.L. 2 and F.L. 3 do, whereby the micro-air-bubbles are distributed to the desired area surrounding the submerged portion of the hull 2, thus reducing frictional-resistance at the hull of the ship while cruising.

Figure 4:
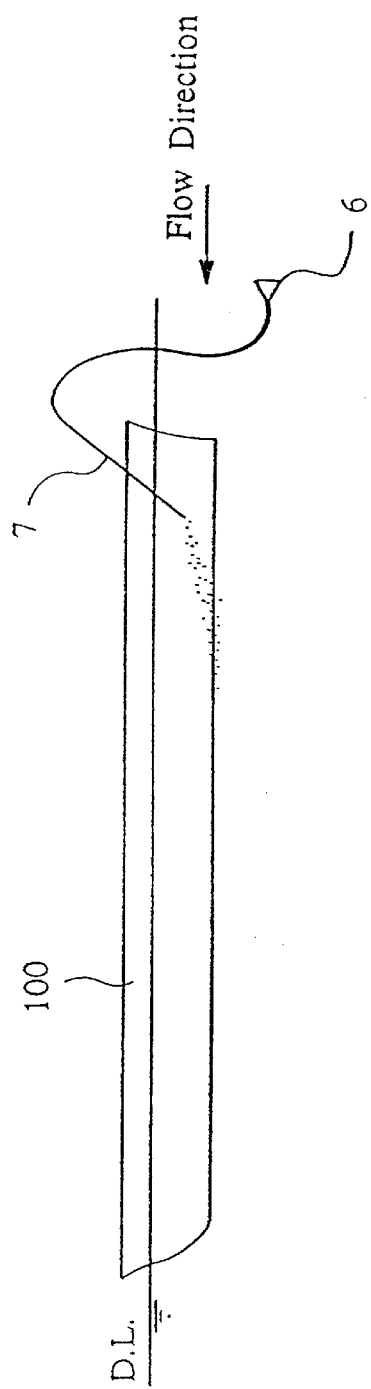
FIG. 4 shows a example of the method for analyzing the stream lines, and a schematic side view of a model ship and an apparatus used for the analysis.
Figure 5:
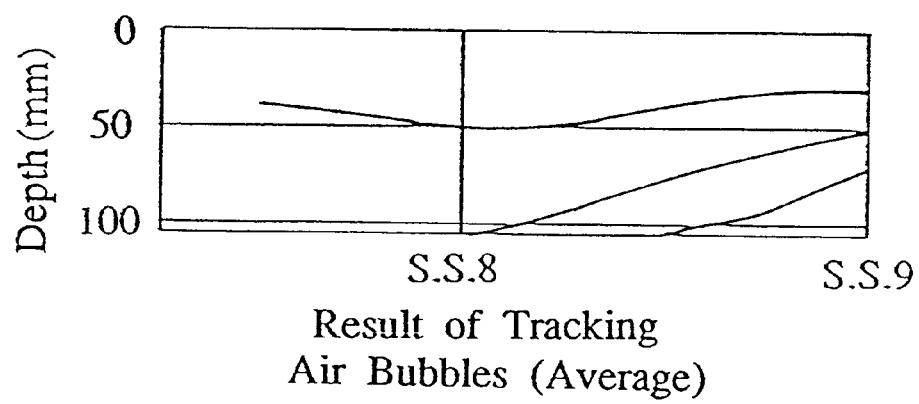
FIG. 5 shows a graph of the result of the analysis of the stream lines obtained by the apparatus shown in FIG. 4.

In order to confirm the existence of stream lines which draw various curves, an experiment was conducted in which in practice a model ship 100 having a length of 2,000 mm is set afloat in a circulating water channel, as shown in FIG. 4, and air bubbles of approximately 500 $\mu$m in diameter are ejecting from a tube 7 connected to an air supply 6. FIG. 5 shows a video analysis for loci of the displacements of the air bubbles. FIG. 5 shows the result in the case in which the water flow was set at 1.0 m/s, and the three loci show the average values. It is found from the results shown in FIG. 5 that the loci drawn by air bubbles differ depending on the level (height) of the air ejecting positions at the stem, and that there are certain stream lines which respectively draw different lines.

Figure 6:
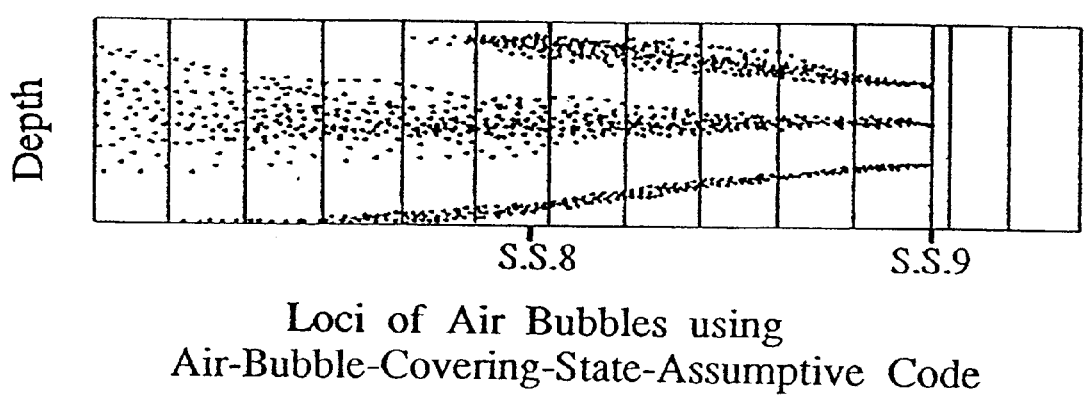
FIG. 6 shows a graph of the stream lines shown in FIG. 5 obtained by C.F.D.

FIG. 6 shows, on the other hand, the stream lines calculated, under the same conditions as the above, by C.F.D. (that is, by Computational Fluid Dynamics). FIG. 6 shows that the calculated results obtained by C.F.D. nearly coincide with the analysis results based on the experiment shown in FIG. 5.

Furthermore, the inventors have calculated from a given hull's shape, using C.F.D., the motion of the micro-air-bubbles flowing along the stream line at the circumference of the hull and the distribution of the void fraction at an arbitrary position with respect to the hull. In consideration of the motion of the micro-air-bubbles, the influence by the turbulence diffusion was also considered by imparting turbulence to the loci of the micro-air-bubbles by changing the flow velocity in the directions of the X-axis, Y-axis, and Z-axis (i.e., the three orthogonal directions) using random numbers based on an assumption of isotropic turbulence. That is, random motions of the micro-air-bubbles were directly simulated by the Monte Carlo Method. Here, the term "void fraction" means, if considering a portion having a given volume Vs in which air bubbles exist, the volume Va occupied by the air bubbles with respect to the total volume Vs, and thus, the void fraction can be indicated by the following formula:

$$\text{Void fraction} = Va/Vs$$

Once the motion of the micro-air-bubbles is calculated, the void fraction can be obtained by dividing the total volume of the micro-air-bubbles existing in an examination area (cell) at a given time by the volume of the examination area.

Next, how the motions of micro-air-bubbles and the distributions of the void fraction can be obtained will be described below.

THEORY

The model used is a two-phase fluid model consisting of a air-bubble model and a turbulence model in liquid phase.

The air-bubble mode is based on the particle-following method. Since, in general, the turbulence in a liquid phase should be considered to be unknown, it is considered to be proper, when considering the motions of air bubbles, to use the turbulent-flow field in a liquid phase obtained by repeated calculations as the liquid phase. In practice, for approximate calculations, the turbulent-flow field with no air bubble are assumed as an initial flow field for the liquid phase when considering motions of air bubbles. The Monte Carlo Method is used to obtain the random motions of air bubbles and the local void fraction. The local void fraction can be obtained by dividing the total volume of the air-bubbles existing in each of the divided cell elements in the flow field by the capacity of the cell element.

The turbulence model in the liquid phase is based on the mixing-length model. In accordance with the air-bubble model above, the force received by the liquid phase is assumed to be equal to the fluid reaction of the air bubble generated by a slip.

COORDINATE SYSTEM

Figure 7:
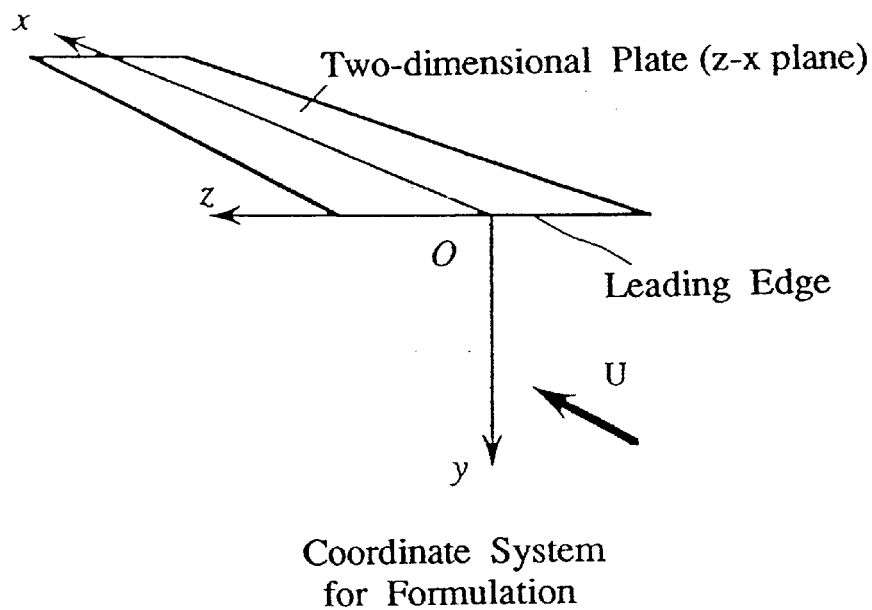
FIG. 7 shows a model of the coordinates used when constructing the theory of the method for analyzing the air bubbles ejected from a ship in accordance with the present invention.

The coordinate system used in constructing the theory is shown in FIG. 7. A two-dimensional plate exists in the z-x plane, the leading edge of which is defined on the z-axis. The main flow flows in the forward direction of the x-axis at a speed of U. Gravity affects the forward direction of the y-axis. In the mixing-length model, although the two-dimensional coordinate system is available, the three-dimensional coordinate system is required when analyzing the random motions of air bubbles. Therefore, the three-dimensional coordinate system is intentionally employed in the present invention in spite of the flow field being analyzed around a two-dimensional plate.

AIR-BUBBLE MODEL

The particle-following method is a Lagrangian method, and in the method, the loci of the particle motions starting from their known initial states at the air-bubble ejecting portion are obtained, and then the state is estimated.

When following air bubbles in water, since the heat capacity of water is much greater than that of the air bubbles, it can be assumed that there is isothermal change. According to the graph of Clift, et al., which estimates the configurations of a bubble (Clift R, Grace J R, Weber M E; 1978; "Bubbles, Drops, and Particles"; Academic Press), it can be assumed that an air bubble maintains its spherical configuration when the diameter of the air bubble is sufficiently small and the relative speed to the liquid phase is low. Forces affecting a single air bubble are defined by gravity and buoyancy as a volume force, Saffman's lift, and Stokes's drag generated by the force caused by the pressure gradient and the relative speed with respect to liquid phase (Saffman P G; 1965; "The Lift on a Small Sphere in a Slow Shear Flow"; J. Fluid Mech; vol. 22; p385–400). Here, in practice, the term referred to as the "Basset-hysteresis-term" (Clift R, Grace J R, Weber M E; 1978; Bubbles, Drops and Particles; Academic Press) may be ignored for the sake of simplicity. In the event that an air bubble adheres to a wall surface, it is considered that the air bubble receives a vertical reaction force from the wall surface which fulfills the object-surface-condition.

Equations for a single air bubble are obtained from the above equations (1)–(3).

Here, it is determined that the vertical reaction forces Nx, Ny, and Nz act only when an air bubble adheres to the wall surface, and the condition of the equation (4) is fulfilled on the wall surface.

There are six unknown quantities, that is, X, Y, Z, Nx, Ny, Nz, whereas there are five equations (1)–(4) (note, that equation (4) includes two equations). Therefore, the six unknown quantities can be determined by adding the condition that the directions of Nx, Ny, and Nz are normal directions of the wall. The diameter of an air bubble is also changed depending on the change of the volume of the air bubble, using Boyle's Law, on the assumption of isothermal change (Equation (5)).

The random motions of an air bubble is represented by the Monte Carlo Method. The basic idea depends on the PSI-CELL Method (Masuko A, Ogiwara S; 1989; "Numerical Simulation of Viscous Flow Around a Practical Hull Form"; 5th International Conference on Numerical Ship Hydrodynamics; p211–223). Here, the liquid phase in the cell element is assumed to be an isotropic turbulent flow, and then turbulence is given to the flow velocity. The turbulent flow velocities of the liquid phase $u'_L$, $v'_L$, and $w'_L$ are represented by equation (6), using random points $x_s$, $y_s$, and $Z_s$ on a unit sphere and the turbulent flow velocity $q'_L{}^{(i)}$ at an i-step.

The points $x_s$, $y_s$, and $z_s$ are obtained by Shibuya's Method (Shibuya M; 1962; "A Method for Generating Uniformly Distributed Points on N-dimensional Spheres"; Ann. Inst. Stat. Math.; vol. 14, p81). When the turbulence energy $k_L$ of the liquid phase and the dissipation factor $\epsilon_L$ are given, $q'_L{}^{(i)}$ is represented by the equations (7)–(10), using the primary Markov Process model.

By solving the equations of motion (1), (2), and (3), the loci of air bubbles can be obtained. The local void fraction can be obtained by dividing the total volume of the air-bubbles existing in each cell element by the capacity of the cell element.

After the void fraction is obtained, it is required to examine the collision among the air bubbles using a theory of molecular motion. When one particle is entrapped by a phase consisting of a plurality of particles having the same diameters and uniformly distributed, the average free path $l_b$ of the particle, when colliding with another particle, is represented by the following equation (11):

$$l_b = \frac{d_b}{6\alpha} \tag{11}$$

where $d_b$ is a particle size, that is, a diameter of an air bubble, and $\alpha$ is the local void fraction.

When the representative-length of the flow field is L, the condition in which the collision among the air bubbles can be ignored is represented by the following equation (12):

$$\frac{l_b}{L} > 1 \tag{12}$$

When substituting equation (11) for equation (12), the condition of the local void fraction in which the collision among the air bubbles can be ignored is represented by the following equation (13):

$$\alpha < \frac{d_b}{6L} \tag{13}$$

TURBULENCE MODEL IN LIQUID PHASE

When micro-air-bubbles in the turbulent boundary layer undergo random motions caused by the turbulence of the liquid phase, it is assumed that the fluctuation in the y-direction generates a shear force affected by the velocity gradient and that the shear force will affect the frictional-resistance reduction. In the turbulent boundary layer, although air bubbles will follow the surrounding fluid particles and/or the random motions of the fluid lump to a certain extent, a slip is generated by an apparent inertia of the air bubbles, and the liquid phase receives a force proportional to the reaction force of air bubbles. Giving attention to the x-direction, the time-average of the force generated by the fluctuation in the x-direction is zero. On the other hand, the time-average of the force generated by the fluctuation in the y-direction is, due to the velocity gradient in the shear flow, proportional to the root mean square of the velocity gradient and the displacement of the air bubble. Other subjects to be considered besides the above may be the development of new turbulence caused by a following-wake due to large air bubbles, a dissipation of turbulence energy in the liquid phase resulting from the friction of air bubbles, and the energy exchange caused by changes in the configuration of surfaces of air bubbles. In practice, in the embodiment of the present invention, three of these subjects are ignored for the sake of simplicity.

First, using the Lagrangian method, the relationship of the root mean square of the turbulence flow velocity $v'_L$ in the liquid phase in the y-direction and the root mean square of the displacement Y of an air bubble with respect to the turbulence flow velocity in the y-direction is obtained. When considering the inside of the boundary layer in the x-y plane, assumptions represented by the following equations (14)–(16) are provided:

$$\bar{v}_L = 0 \tag{14}$$

$$(\bar{u}_L + u'_L - \dot{X})\left(\frac{\partial \bar{u}_L}{\partial y}\right)^{\frac{1}{2}} \cong 0 \tag{15}$$

$$v\frac{\partial P}{\partial y} \cong 0 \tag{16}$$

The assumption of equation (15) means that the Saffman's-lift term is ignored for the sake of convenience. In a general case in which equation (15) cannot be derived, if it can be assumed that the root mean square of $u'_L$ is approximately equal to the root mean square of $v'_L$ when considering only the effect of the turbulence flow velocity $u'_L$ in the x-direction, the relation equation may be derived which is the same as the following equation (18). Therefore, even if equation (15) is assumed to be applicable for the sake of convenience, as mentioned above, Saffman's-lift term can be approximated by taking into consideration by adjusting the proportionality constant $k_1$ later. The equation for the motion of an air bubble with respect to the fluctuation in the y-direction is represented by the following equation (17) if constant external forces, such as gravity and buoyancy are omitted.

$$\frac{m_b + m_A}{6\pi\mu_L(d_b/2)}\ddot{Y} + \dot{Y} = v'_L \tag{17}$$

It is possible, by obtaining the absolute value of frequency response function of equation (17), to know the relationship between the root mean square of $v'_L$ and the root mean square of Y (equation (18)):

$$\frac{\hat{Y}}{\hat{v}'_L} = \left\{1 + \left(\frac{m_b + m_A}{3\pi\mu_L d_b}\omega_L\right)^2\right\}^{-\frac{1}{2}}\frac{1}{\omega_L} \tag{18}$$

where $\omega_L$ is an angular frequency of turbulence.

The relationship between the angular frequency of turbulence and the integral time scale $T_{*L}$ is represented by the following equation (19):

$$\frac{1}{\omega_L} \cong \frac{T_{*L}}{2\pi} \tag{19}$$

Since $m_b + m_A$ is proportional to $d_b^3$, equation (18) is approximately represented by the following equation (20) when $d_b$ is sufficiently small.

$$\frac{\hat{Y}}{\hat{v}'_L} \cong \frac{1}{\omega_L} \cong k_1 T_{*L} \tag{20}$$

where $k_1$ is the proportionality constant.

Next, the stress-reduction model will be constructed using a method such as Euler's method. In practice, in the embodiment of the present invention, the mixing-length model is employed as a turbulence model.

Figure 8:
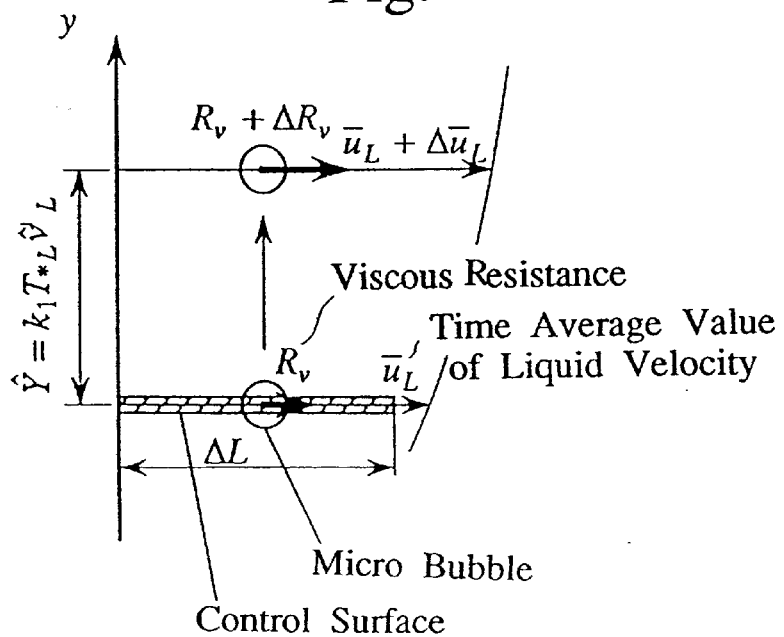
FIG. 8 shows a stress-reduction model used in the method for analyzing the air bubbles ejected from a ship in accordance with the present invention.

FIG. 8 shows the stress-reduction model in which a curve of the time-average $\bar{u}_L$ of flow velocity in the x-direction at an arbitrary position in the x-y plane is shown. The model shown in FIG. 8 is an elemental model in which only one air bubble exists in a flow having a velocity gradient $\hat{Y}$ is the root mean square of the displacement in the y-direction when the air bubble fluctuates due to the turbulence in the liquid phase. Because of the fluctuation in the shear flow, the air bubble is apparently traveled over the root mean square $\hat{Y}$, and the flow velocity around the air bubble will increases by $\Delta\bar{u}_L$. Here, the increase of the viscous resistance is assumed to be $\Delta R_v$ [N]. Now, a control surface element which is a square having side $\Delta L$ is considered in a plane perpendicular to the y-axis. Assuming that the element corresponds to only one air bubble, the side length of the square is represented by the following equation (21):

$$\Delta L = \left(\frac{\pi}{6\alpha}\right)^{\frac{1}{3}} d_b = k_2 \alpha^{-\frac{1}{3}} d_b \tag{21}$$

where $k_2$ is the proportionality constant.

When the position of the air bubble fluctuates due to the turbulence of the liquid phase, the increase in the horizontal force received by the air bubble is represented by the following equation (22):

$$\Delta R_v \propto 6\pi\mu_L(d_b/2)\Delta\bar{u}_L = k_3\rho_L v_L d_b \hat{Y}\frac{\partial \bar{u}_L}{\partial y} \tag{22}$$

where $k_3$ is the proportionality constant representing the apparent slip ratio and the coefficient of frictional-resistance.

The liquid phase will receive a reaction force of the same magnitude as equation (22) from the air bubble, and the stress is then reduced. Based on equations (20), (21), and (22), the stress reduction amount is represented by the following equation (23):

$$\Delta\tau_t = \frac{\Delta R_v}{\Delta L^2} \tag{23}$$

$$= \frac{k_1 k_3}{k_2^2}\rho_L v_L T_{*L} \alpha^{\frac{2}{3}} d_b^{-1} \hat{v}'_L \frac{\partial \bar{u}_L}{\partial y}$$

Here, having established the following assumption, with respect to equation (23), represented by equation (24):

$$v_L T_{*L} = \lambda_L^2/10 \tag{24}$$

$$= \lambda_1 y$$

where $\lambda_1$ is the proportionality constant representing the turbulence scale of the liquid phase.

Equation (24) is the assumption that the square of Taylor's turbulence scale $\lambda_{*L}^2$ increases in proportion to the distance from the wall. The validity of the assumption will be briefly examined later on by calculating the square of Taylor's turbulence scale with no air bubbles $\lambda_{L0}^2$. Representing the decrease amount of the mixing-length by $l_{mb}$ for the sake of convenience, the following equations (25), (26), and (27) can be derived:

$$l_m = l_{m0} - l_{mb} \tag{25}$$

$$l_{m0} = \kappa y \tag{26}$$

$$\Delta \tau_t = k_4 \rho_L l_{mb} \hat{v}'_L \frac{\partial \bar{u}_L}{\partial y} \quad (27)$$

where $k_4$ is the proportionality constant.

From the equations (23)–(27), the following equation (28) is obtained:

$$l_m = \left(\kappa - \frac{\lambda_m}{d_b} \alpha^{\frac{2}{3}}\right) y \quad (28)$$

where $\lambda_m$(m) is the amount representing the apparent turbulence scale, including, as proportionality constants, the apparent slip ratio and the coefficient of friction of an air bubble, or the like, which has a dimension of length. The symbol $\kappa$ is the constant in the wall law at a turbulent area with no bubbles.

For simplicity, calculations will be made hereinbelow for the state in which the void fraction is substituted by a representative void fraction which does not depend on y. Here, for practical and easy calculation, $\alpha$ in equation (28) is substituted by the apparent void fraction $\alpha_m$, and the constant $\kappa_1$ (i.e., the constant of the wall law at a turbulent area with bubbles) is defined by the following equation (29)). The definition of $\alpha_m$ will be described hereinafter in conjunction with the explanation of FIG. 14.

$$\kappa_1 = \kappa - \eta_m \alpha_m^{\frac{2}{3}} \quad (29)$$

where $\eta_m$ is defined by the following equation (30):

$$\eta_m = \frac{\lambda_m}{d_b} \quad (30)$$

In this embodiment, $\eta_m$ is a constant and obtained by experimentally.

In the case in which there are no bubbles, to obtain the coefficient of frictional-resistance of the wall surface, the following equations (31) and (32) are employed (Ikui T; Inoue M; 1978; Dynamics of Viscous Fluid (in Japanese); Rikougakusha; p 149). $R_{ex}$ is the Reynolds number, and B is a constant of the wall law at a turbulent area.

$$R_{ex} = \frac{1}{\kappa} e^{-\kappa B} \left\{ e^{\kappa \sqrt{2/C_{f0}}} \left(\frac{2}{C_{f0}} - \frac{4}{\kappa}\sqrt{\frac{2}{C_{f0}}} + \frac{6}{\kappa^2}\right) - \left(\frac{2}{\kappa}\sqrt{\frac{2}{C_{f0}}} + \frac{6}{\kappa^2}\right) \right\} \quad (31)$$

$$R_{ex} = \frac{Ux}{v_L} \quad (32)$$

In the case in which there is an air bubble, the coefficient of frictional-resistance of the wall surface can be obtained by substituting $\kappa_1$ for $\kappa$ in equation (31). That is, using equations (29), (31), (32), and the following equation (33), the frictional-resistance ratio $C_f/C_{f0}$, that is the ratio of the coefficient of frictional-resistance $C_{f0}$ in the state in which no micro-air-bubbles are ejected to the coefficient of frictional-resistance $C_f$ in the state in which micro-air-bubbles are ejected, is obtained.

$$R_{ex} = \quad (33)$$

$$\frac{1}{\kappa_1} e^{-\kappa_1 B} \left\{ e^{\kappa_1 \sqrt{2/C_f}} \left(\frac{2}{C_f} - \frac{4}{\kappa_1}\sqrt{\frac{2}{C_f}} + \frac{6}{\kappa_1^2}\right) - \left(\frac{2}{\kappa_1}\sqrt{\frac{2}{C_f}} + \frac{6}{\kappa_1^2}\right) \right\}$$

RESULT OF CALCULATIONS

Figure 9:
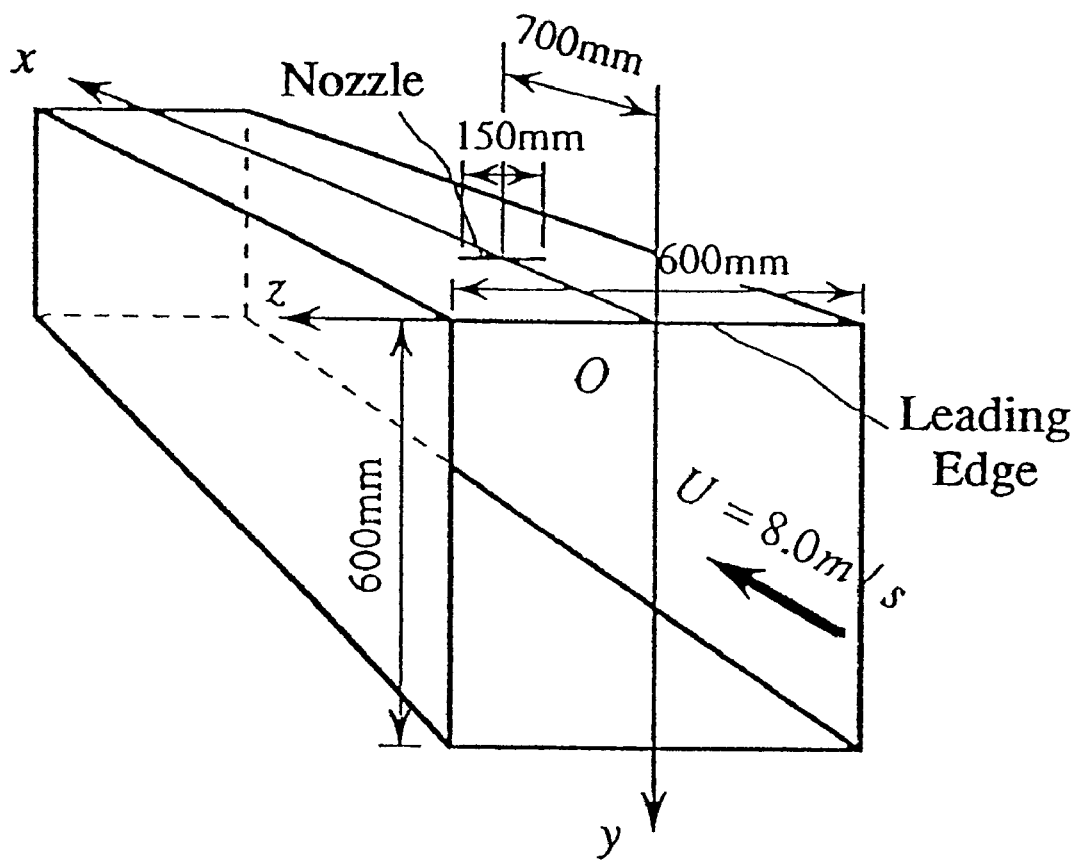
FIG. 9 shows a model of the coordinates used when calculating using the analyzing method in accordance with the present invention.

FIG. 9 shows the coordinate system used for the calculations. The object to be calculated is a cavitation tunnel having an air bubble ejecting nozzle at its ceiling part. The cavitation tunnel has a sectional shape of a square having a side of 600 mm. The main flow velocity is 8 m/sec. The apparent leading edge is on the z-axis. The nozzle is positioned 700 mm downstream from the leading edge and has a span of 150 mm. The nozzle has a depression angle of 20° with respect to the direction of the main flow and has a width of 5 mm. In the experiment, a mixture consisting of water flowing at a rate of 10 liters/min and air flowing at a rate of 35–200 liters/min is ejected into the turbulent boundary layer through the slit. In the calculations, the effects of the water are ignored for the sake of simplicity.

With regard to the initial position of the air bubbles, the slit was divided into twenty sections, and then the loci of air bubbles starting from twenty-one of the nodal points were calculated. On the assumption that air bubbles may already be formed before ejection from the slit (since air already exists in a mixture with water), the initial velocity was regarded as the average velocity of the mixed fluid at the slit. The sampling period was set at 0.001 second.

Figure 10:
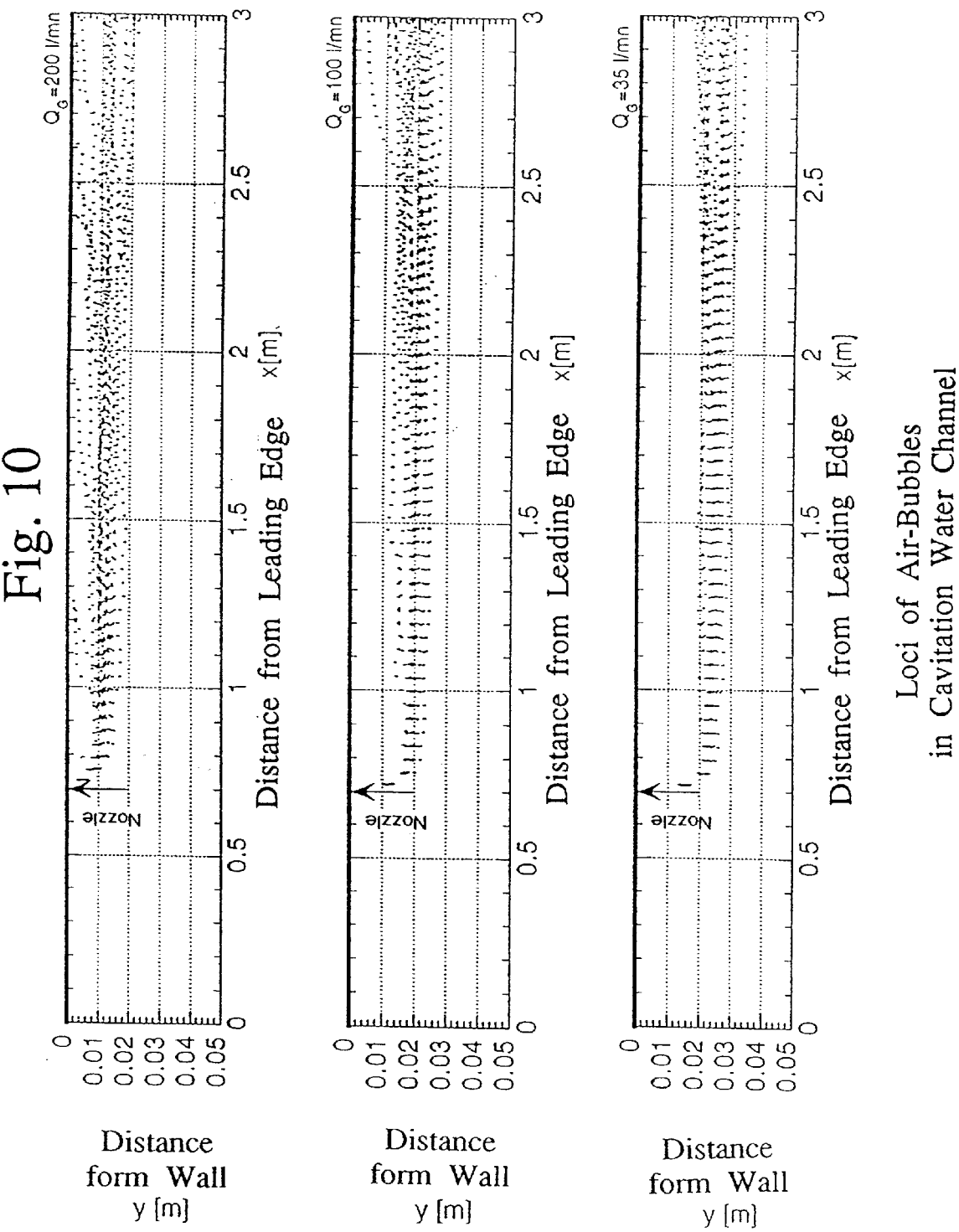
FIG. 10 shows charts of the distribution of loci of air bubbles obtained by the analyzing method of the present invention.

The result of calculations for the loci of the air bubble is shown in FIG. 10. FIG. 10 is a side view in which the axis of ordinates stands for the distance from the wall (i.e., the ceiling) and the axis of abscissas stands for the distance from the leading edge. In order to see the extent of diffusion of air bubbles ejected from the nozzle as they travel downstream, the scales of the axes of the ordinates and those of the axes of the abscissas have been shown differently by intention. The loci are shown by plotting the positions of air bubbles every 0.005 seconds. As a general trend, it can be seen that air bubbles diffuse as they travel downstream. The influence by the buoyancy of the air bubbles can also be seen in that the bubble tend to come close to the wall as they move downstream. The influence of the buoyancy is greater in the area near the wall where the flow velocity is low, and thus, the air bubble rises up to the wall while it flows over a short distance once it comes close to the wall. It is also can be seen that there is a tendency for the loci to move away from the wall when the air flow rate is low. The reason for this can be explained as follows. Since the initial velocity of the air bubble is given by the average velocity of the mixed fluid, the initial velocity decreases when the flow rate is reduced. Due to this, the relative velocity with respect to liquid is reduced, and the Saffman's-lift term in the equation of motion (2) then increases. In the result of the calculations, an effect similar to the case of ejecting the air bubbles from a position away from the wall has, in appearance, been obtained by compensating for the decrease of the flow rate by increasing the buoyancy force imparted to the air bubble existing near the nozzle.

Figure 11:
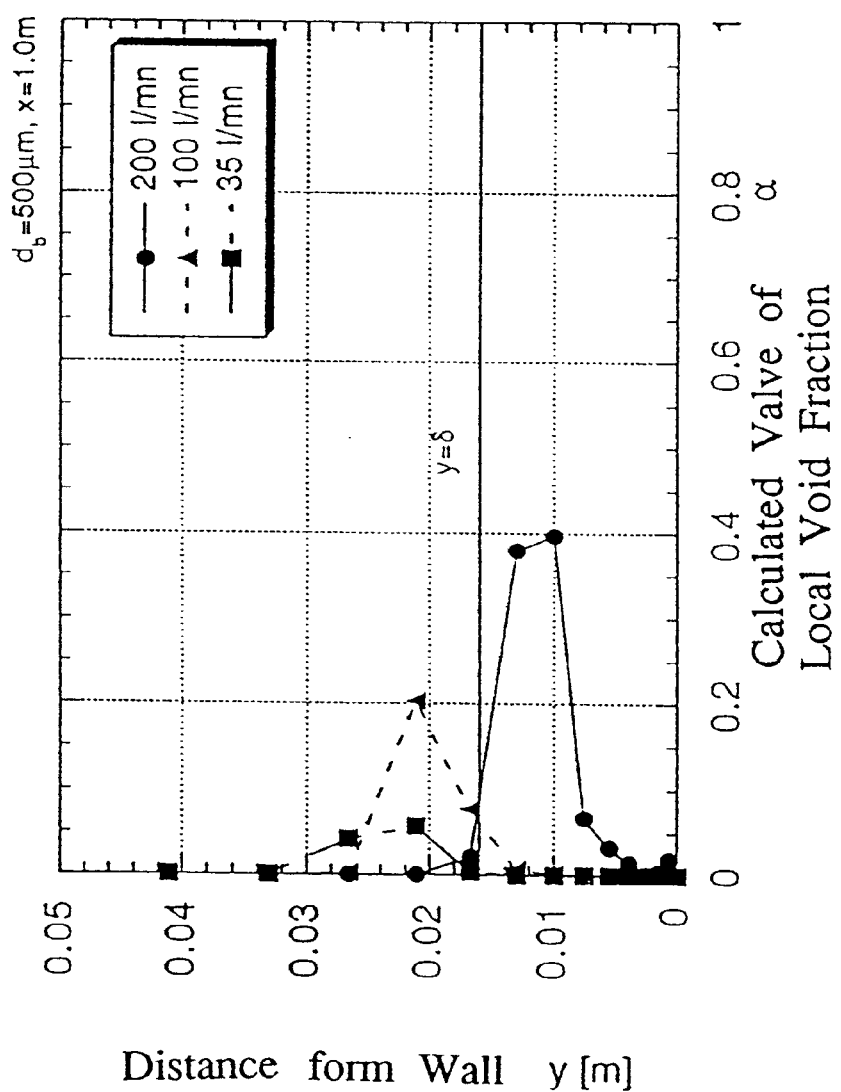
FIG. 11 shows a local void fraction distribution graph at x=1.0 m and z=0.

FIG. 11 shows the calculated result of the local void fraction distribution at x=1.0 m and z=0. When the air flow rate is 35 liters/min or 100 liters/min, the peak point exists outside the estimated value of the thickness of the boundary layer. When the air flow rate is 200 liters/min, the peak value of the local void fraction reaches about 0.4, which is relatively high for the void fraction of air-bubble flow.

Figure 12:
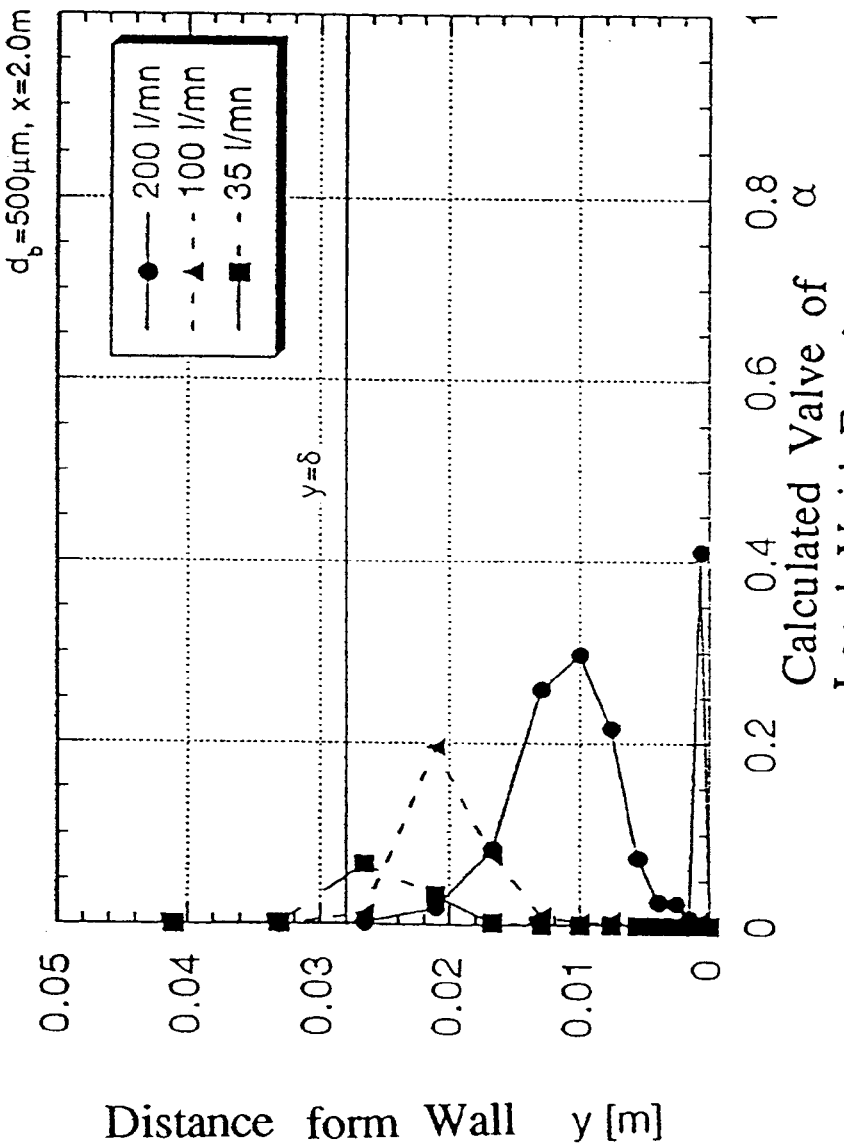
FIG. 12 shows a local void fraction distribution graph at x=2.0 m and z=0.

FIG. 12 shows the calculated result of the local void fraction distribution at x=2.0 m and z=0. When the air flow rate is 35 liters/min, the peak point exists near the estimated value of the thickness of the boundary layer. When the air flow rate is 100 liters/min, the peak point exists inside the estimated value of the thickness of the boundary layer. In general, in comparison with the distribution shown in FIG. 11, it appears to be somewhat more diffused. When the air flow rate is 200 liters/min, another peak value appears near the wall. The reason for this can be explained as follows. When the air flow rate is great, the Saffman's-lift term becomes less significant, as opposed to the above-explained case in which the air flow rate is small, and thus the probability of the air bubble coming close to the wall becomes relatively high. When an air bubble comes close to the wall, although the velocity gradient and the turbulence of the liquid phase increases, the Saffman's-lift term in equation (2) becomes relatively small (or negative in some cases) if the air bubble comes close beyond a definite area since the flow rate itself decreases. On this situation, the Saffman's-lift term becomes considerably small compared to the buoyancy, or acts in the same direction as the buoyancy, thus preventing the air bubble from leaving the wall surface. The air bubbles falling into such a situation will be continuously accumulated as they move downstream, thus the peak value appears near the wall.

Figure 13:
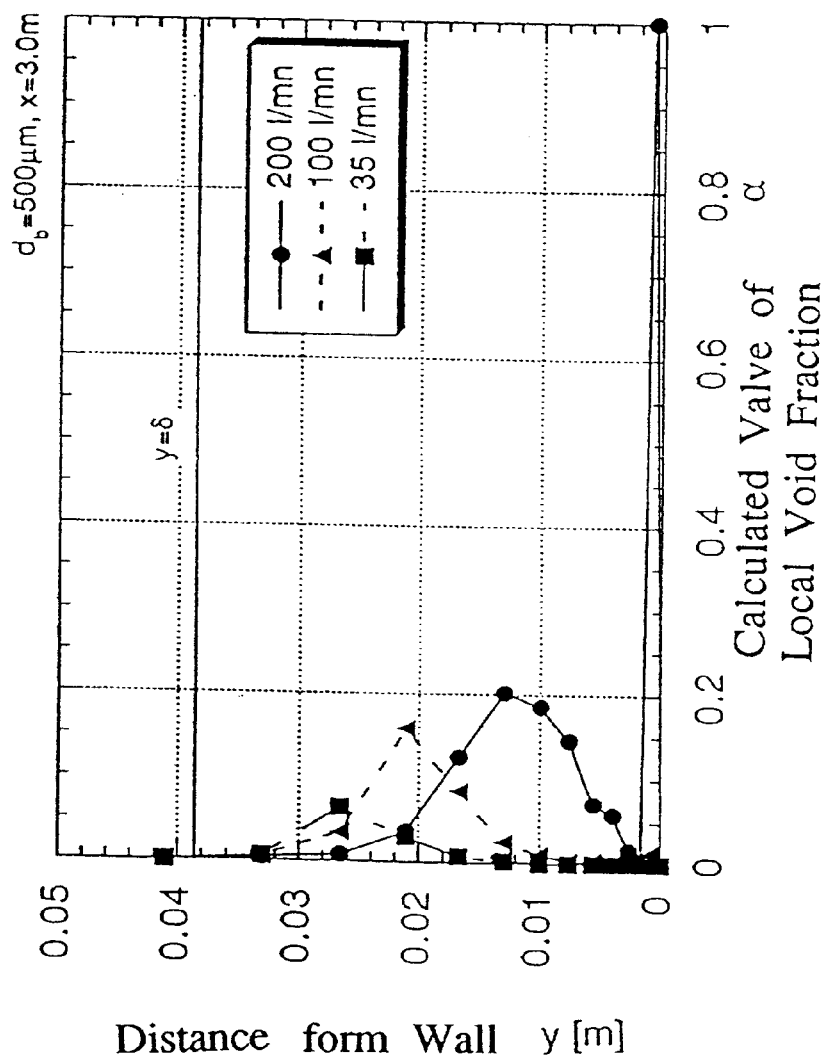
FIG. 13 shows a local void fraction distribution graph at x=3.0 m and z=0.

FIG. 13 shows the calculated result of the local void fraction distribution at x=3.0 m and z=0. When the air flow rate is 200 liters/min, the peak value is about 0.2, whereas the void fraction near the wall increases to the extent that it is saturated. When the air flow rate is 35 liters/min or 100 liters/min, there is no great peak near the wall.

Figure 14:
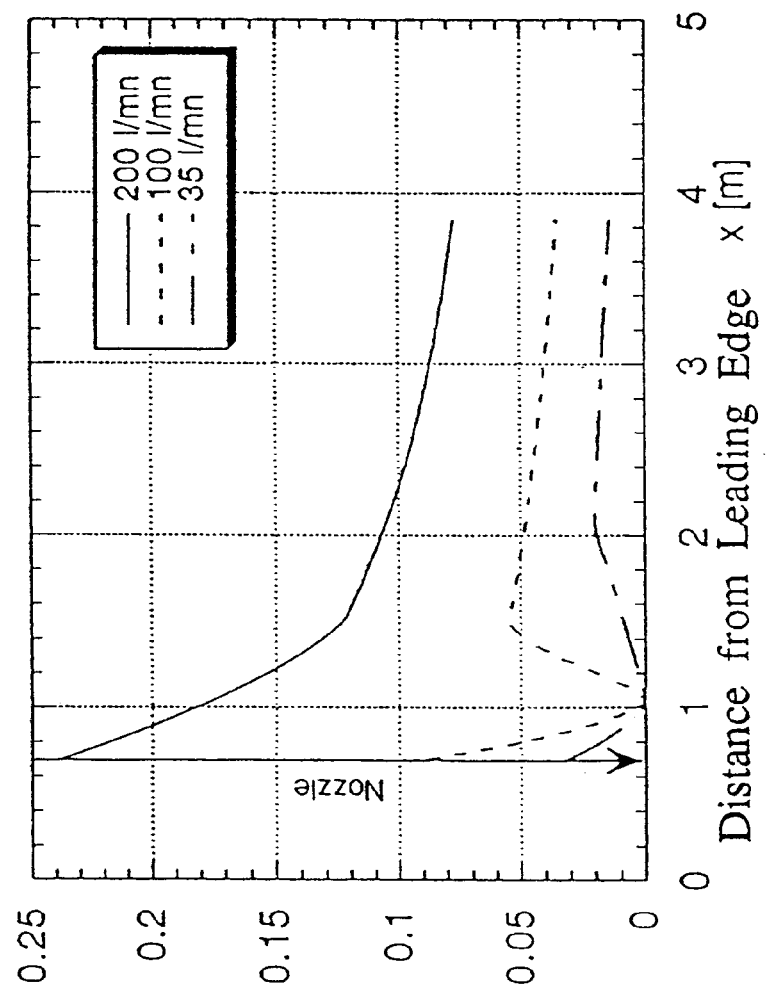
FIG. 14 is a graph showing the relationship of the void-fraction-volume-average in the boundary layer at z=0.

FIG. 14 shows the calculated result of the void fraction volume average in the boundary layer at z=0. When the flow rate is 35 liters/min or 100 liters/min, since the peak point of the local void fraction comes inside the boundary layer from the outside, the volume-average once decreases down to approximately zero. After that, the volume average once rises up to a certain value and then decreases monotonically. In the case of 200 liters/min, the calculated result is represented by a monotonically decreasing curve since the void peak always appears inside the boundary layer. In the embodiment of the present invention, the void fraction shown in FIG. 14 is used as an apparent void fraction $\alpha_m$ in equation (29).

After obtaining the void fraction, the conditions of the local void fraction to make it possible to ignore the collision among air bubbles may then be calculated. The representative-length in the flow field is represented by the thickness of the boundary layer located most-downstream (i.e., at x=3.0 m) among the cross sections calculated. That is, L is defined as 0.04 m.

According to equation (13), when $d_b$=500 $\mu$m, the local void fraction in which the collision among air bubbles can be ignored is $\alpha$<0.002. On the other hand, if the representative-length in the flow field is represented by the mixing-length with no air bubbles, y=0.0007 m at the void peak near the wall and the mixing-length is $l_{m0}=k_y=$ 0.000287 m if k=0.41. When L=0.000287 m, $\alpha$<0.290. In either case, it is understandable that the collision among air bubbles must be considered in order to accurately calculate the void fraction distribution in cross section.

Figure 15:
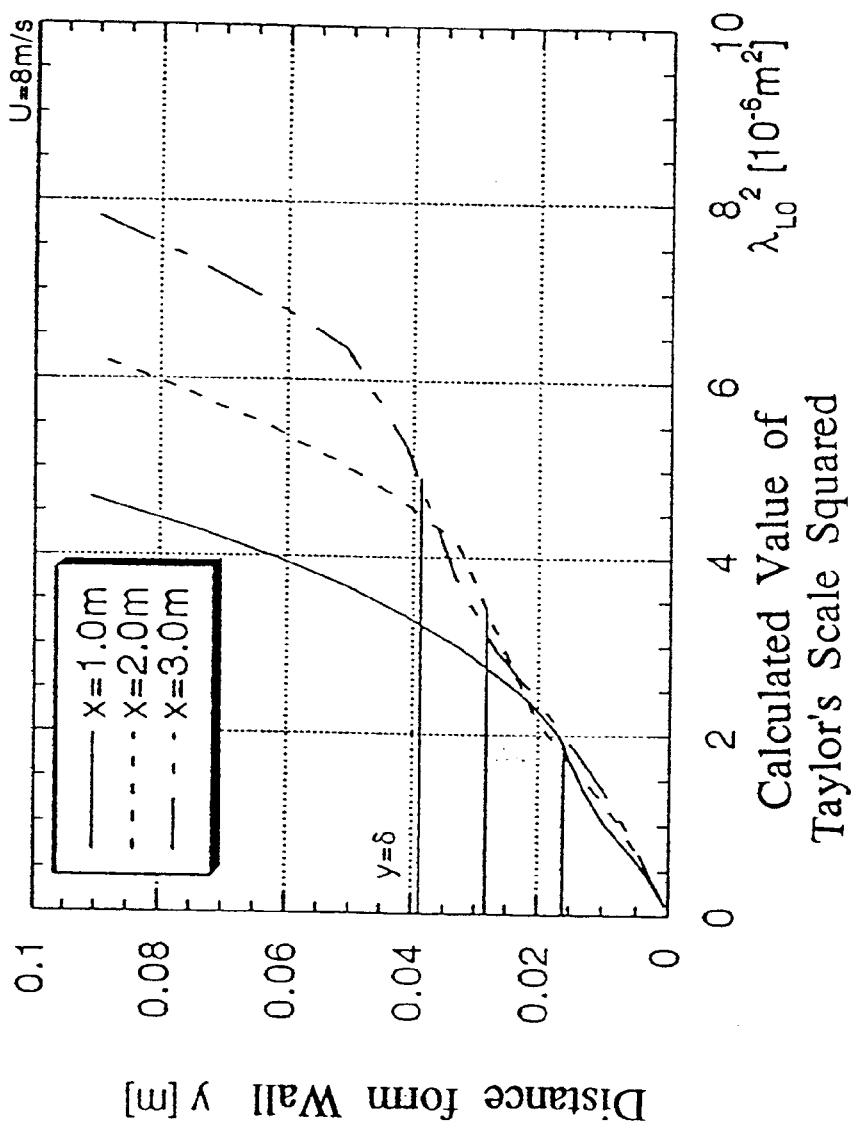
FIG. 15 is a graph showing the relationship between the turbulence scale squared and the distance from the wall.

FIG. 15 shows the result of the relationship between the square of Taylor's turbulence scale and the distance from the wall, which is estimated from the calculated result of the turbulent flow field with no air bubbles using the C.F.D Code. The result shows that in the turbulent-flow-field with no air bubbles, the square of Taylor's turbulence scale is, in a turbulent-flow area, approximately proportional to the distance from the wall. The assumption in the equation (24) means that any equation usable for the case of no air bubbles can also be approximately used for the air-bubble flow.

FIG. 16 shows the calculated result, using equations (31) and (33), of the local frictional-resistance reduction ratio $C_f/C_{f0}$ by substituting the apparent void fraction shown in FIG. 14 for equation (29). In FIG. 16, the result of the experiment in the case of using the cavitation tunnel is also plotted. The condition of the calculation is: k=0.48, B=4.9. The coefficient $\eta_m$ is 0.85 and is constant. The model almost agrees with the result of the experiment when the air flow rate is 200 liters/min. When the air flow rate is 35 liters/min or 100 liters/min, $C_f/C_{f0}$ increases almost to 1 immediately downstream of the nozzle because of rapid reduction of the void fraction. The cause of this is that in the model the influence of the peak point in the void fraction is determined as being in one of two alternative states; i.e., whether the peak point exists inside or outside the boundary layer.

Therefore, it is possible to determine the position for ejecting air, by calculating the stream lines enabling the void fraction to be high for effectively reducing the fractional resistance, based on the distribution of the void fraction obtained as in the above.

It should be noted, however, that the analysis of the stream lines and the determination of the position for ejecting air relating thereto can also be achieved without using C.F.D. For example, the analysis of the stream lines can be achieved using a method referred to as the Oil Film Method in which dye is applied on the hull 2 and then the loss of the applied dye is monitored. Also, the determination of the position for ejecting air can be achieved by a simulation with a model ship such as is shown in FIG. 4.

Figure 17A:
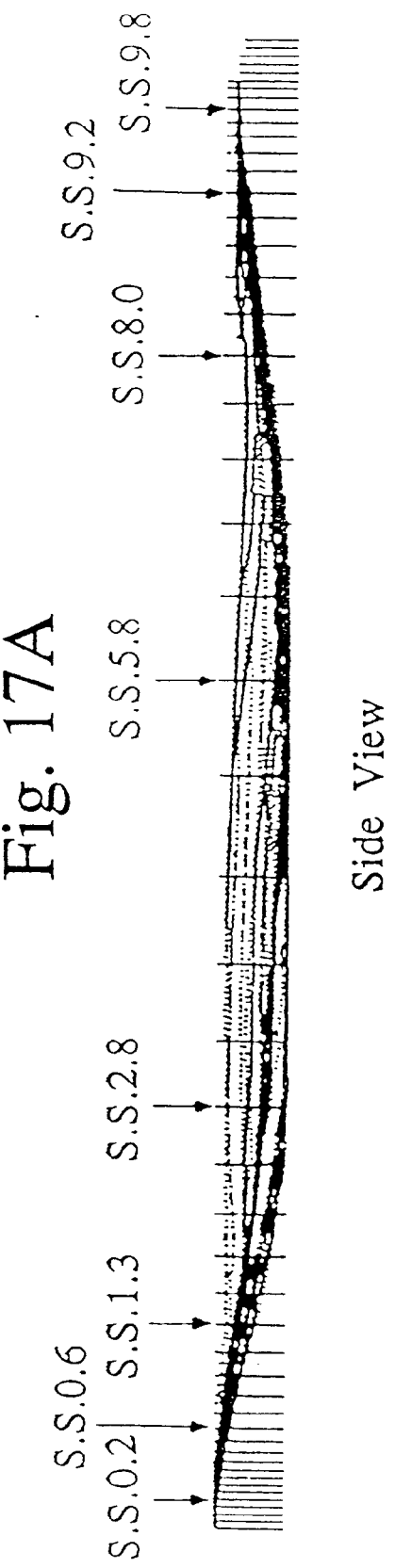
FIG. 17A shows a side view of the stream lines obtained by C.F.D.
Figure 17B:
FIG. 17B shows a perspective view of the stream lines obtained by C.F.D., from a viewpoint located obliquely below.
Figure 18A:
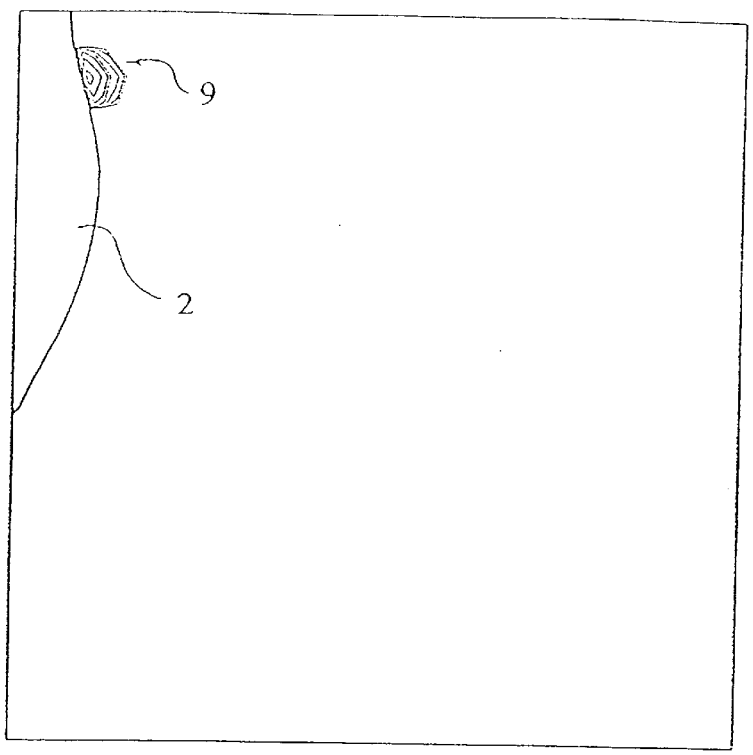
Figure 18B:
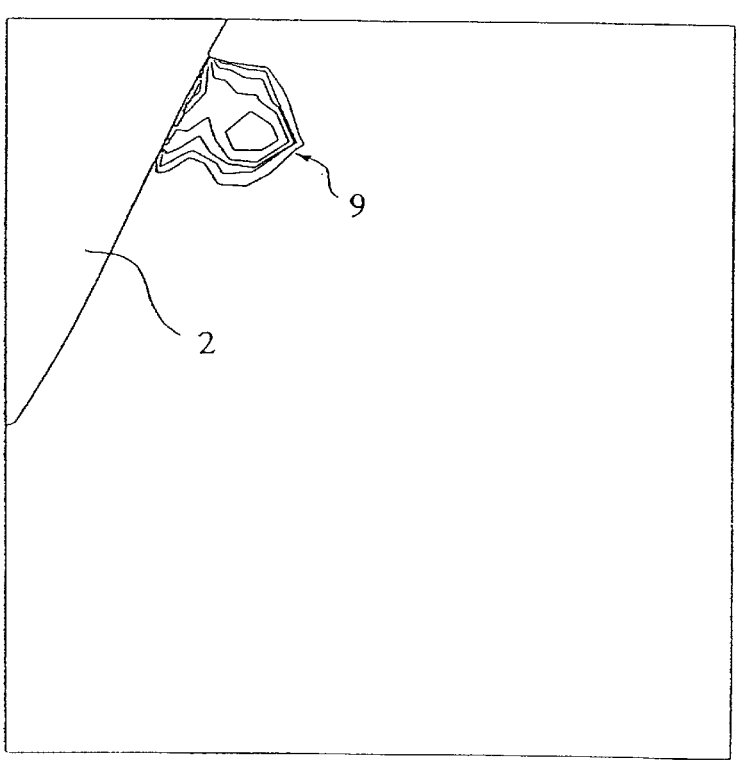
Figure 18E:
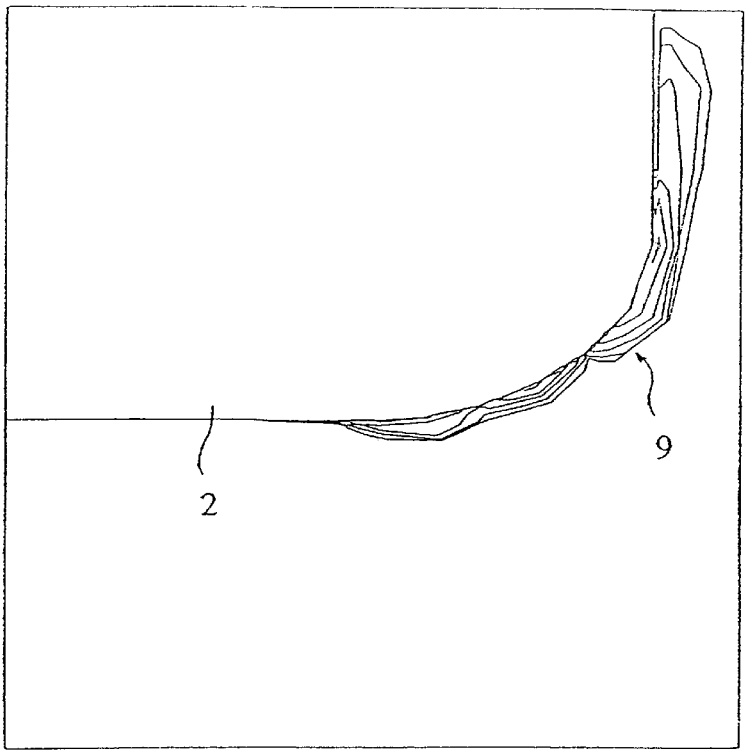
Figure 18F:
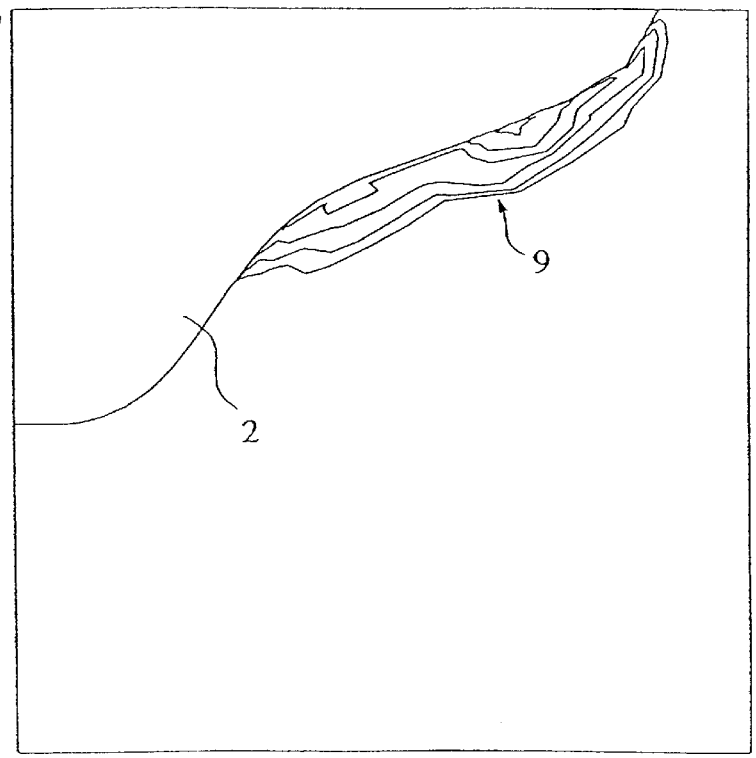
Figure 18G:
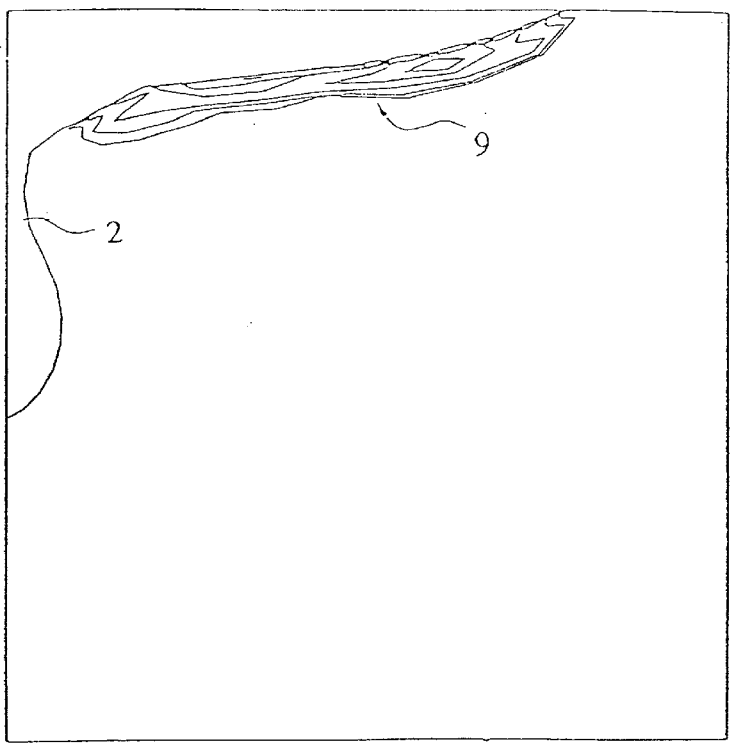
Figure 18H:
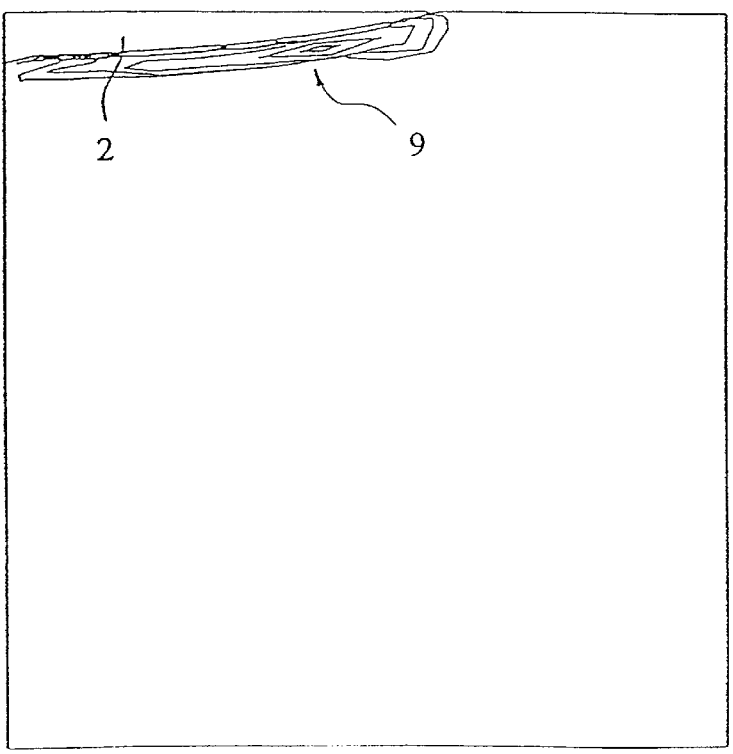

FIGS. 17A and 17B respectively show a state, obtained by C.F.D., in which the micro-air-bubbles ejected from the stem portion are carried by the stream lines and cover the hull: FIG. 17A shows a side view, and FIG. 17B shows a perspective view thereof. FIGS. 18A through 18H respectively show a state of the distribution of the void zone 9 at a respective station of S.S.-9.8, S.S.-9.2, S.S.-8.0, S.S.-5.8, S.S.-2.8, S.S.-1.3, S.S.-0.6, and S.S.-0.2 in FIG. 17A. In this case, the void zone where the micro-air-bubbles exist is depicted by ten contour lines for the void fraction, the void fraction indicated by each contour line being, from the outermost, 0.002, 0.004, 0.008, 0.016, 0.031, 0.063, 0.125, 0.250, 0.500, and 1.000.

It is found, in FIGS. 18A to 18H, that the micro-air-bubbles ejected from the stem portion of the hull 2 are carried by the selected stream lines, then continue on to wrap around the lower part of the side and the bottom of the hull, and form the void zone 9.

Figure 19:
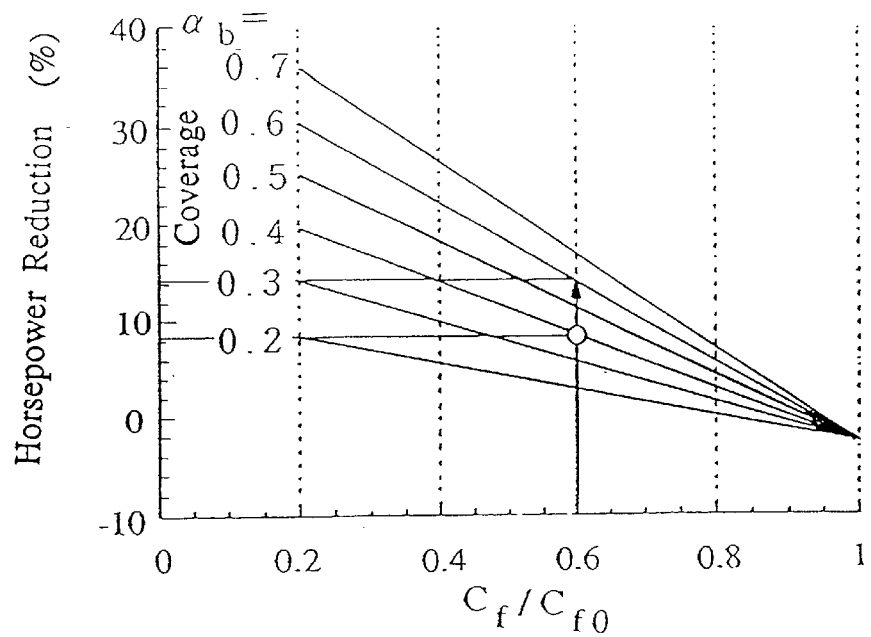
FIG. 19 shows a graph of the relationship between the frictional-resistance ratio and horsepower reduction ratio, while varying the coverage of the micro-air-bubbles over the hull.

FIG. 19 shows the relationship between the frictional-resistance ratio $C_f/C_{f0}$ and the horsepower reduction ratio, when varying the coverage of the micro-air-bubbles distributed around the hull 2 according to the method above. In general, $C_f/C_{f0}$<1 since the relationship between the coefficient of frictional-resistance $C_{f0}$ in the state in which no air is ejected and the coefficient of frictional-resistance $C_f$ in the state in which micro-air-bubbles are ejected is generally $C_f<C_{f0}$. Furthermore, the term "coverage: $\alpha_b$" is the value indicating how much of the zone having a given void fraction (e.g., 0.9) occupies the area with respect to the total submerged area of the hull 2.

It is understood, by the graph shown in FIG. 19, that the horsepower reduction ratio can be improved by increasing the coverage, even if the frictional-resistance ratio $C_f/C_{f0}$ does not change. For instance, as shown in FIG. 19, considering now the case of the frictional-resistance ratio $C_f/C_{f0}=0.6$, it is understood that the horsepower reduction ratio is approximately 8% when the coverage is 0.4 (i.e., over 40% of the total submerged area of the hull is occupied by the portion having over 0.9 of the void fraction) and that, in contrast, the horsepower reduction ratio can be raised to approximately 14%, with the same frictional-resistance ratio, if the coverage is increased to 0.6. Research only intending to decrease the frictional-resistance ratio $C_f/C_{f0}$ (e.g., from 0.6 to 0.4) have thus far been had. However, according to the present invention, on the contrary, it is easily possible to improve the horsepower reduction ratio only by increasing the coverage in the-direction of the arrow depicted in FIG. 19, even if the frictional-resistance ratio $C_f/C_{f0}$ be constant at, for example, 0.6. Thus, the inventors have finally obtained, with the present invention, a means of enabling a method to reduce frictional-resistance with micro-air-bubbles to be effectively utilized.

According to the present invention, since the micro-air-bubbles are generated only from an area adjacent to the stem portion 4 of the hull 2, which is a very small area, and are carried by desired stream lines, then form the required void zone in the circumference of the hull 2, it is important to increase the coverage as much as possible by securely capturing the stream lines.

Figure 20A:
FIGS. 20A through 20C each respectively shows a partial sectional view of the ship's hull, showing the differences in the void area depending on the bubble sizes.
Figure 20B:
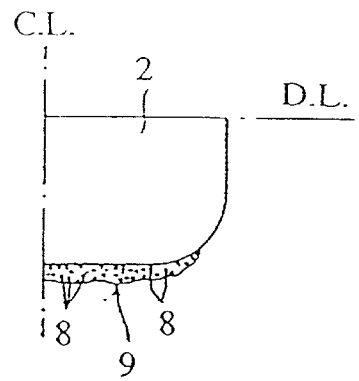
Figure 20C:
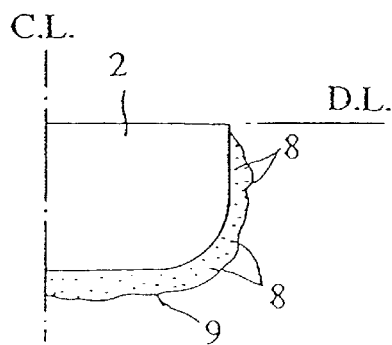

FIGS. 20A–20C show the results of analysis, using a model ship, of the differences of the distributions of the micro-air-bubbles depending on the differences of the sizes thereof, for carrying out the above method in which micro-air-bubbles are ejected from the stem portion and carried by the required stream lines to be distributed around the hull. These drawings all depict the sections at S.S.-5 in FIG. 2; FIG. 20A shows the distribution in the case in which the diameter of the micro-air-bubble 8 is 100 μm, FIG. 20B shows the case in which the diameter of the air bubble 8 is 1,000 μm, and FIG. 20C shows the case in which the diameter of the air bubble 8 is 500 μm.

FIG. 20A shows that when ejecting the micro-air-bubbles 8 having diameters of 100 μm, the bubbles 8 would not be held in the vicinity of the submerged surface of the hull 2 and diffuse over a wide area, and thus, it is not possible to obtain the flow of bubbles along the hull's submerged surface over the entire length, and therefore, it is not possible to form a void zone 9 having a high void fraction. FIG. 20B shows that when ejecting the air bubbles 8 having diameters of 1,000 μm, the bubbles 8 would not be held in the side area of the hull and float upwards due to the large buoyancy due to their large diameters, and thus, the void zone 9 in the side area of the hull would be eliminated. Finally, FIG. 20C shows that when ejecting the air bubbles 8 having diameters of 500 μm, the bubbles 8 would not diffuse nor be eliminated from the side area of the hull by their buoyancy, and thus, existing along the entire submerged surface of the hull 2, this causes the void zone 9 to be effectively formed. As is apparent from the above, when carrying out the method according to the present invention, it is also important to make the diameter of the micro-air-bubble appropriate in order to obtain the desired result.

The analysis above indicates that the most ideal void zone can be formed when the size of the ejected micro-air-bubble 8 is approximately 500 μm. However, the above analysis was carried out in a situation in which the main flow velocity was set at 1.981 m/s using a model ship having a length of 7 meters. According to further research by the inventors, it has been found that for real ships, the most ideal void zone, such as is shown in FIG. 20C, can be formed when the size of the ejected micro-air-bubble is approximately 1 mm (1,000 μm).

As described above, according to the present invention, the micro-air-bubbles are ejected into water from the adjacent position to the starting point of the desired stream lines of water, and from the position where the static pressure is low, so that the ejected micro-air-bubbles are carried by the stream lines to form the desired distributions of voids around the hull 2. As such, it is possible to obtain the required distribution of voids around the hull by ejecting the micro-air-bubbles only from the stem portion of the ship, by appropriately selecting the position for ejecting air bubbles, the size of the air bubbles, and the relative relationship between the speed of the ejecting air and main flow velocity (specifically explained hereinbelow), thus reducing the frictional-resistance. Moreover, since the micro-air-bubble ejection port is provided at a position where the static pressure is low, the required energy for ejecting air can be low in cooperation with the fact that the micro-air-bubble ejection port is provided at a position where the draft is shallow, that is, at a position at which the static head is low. Accordingly, the cruising energy saving amount owing to the reduction of frictional-resistance is not as severely offset by the energy for ejecting air, and this leads to a certain reduction in total power requirements.

Next, embodiments for applying the above-mentioned method according to the present invention to an actual ship will be explained with reference to FIG. 21 through FIG. 28B.

Figure 21A:
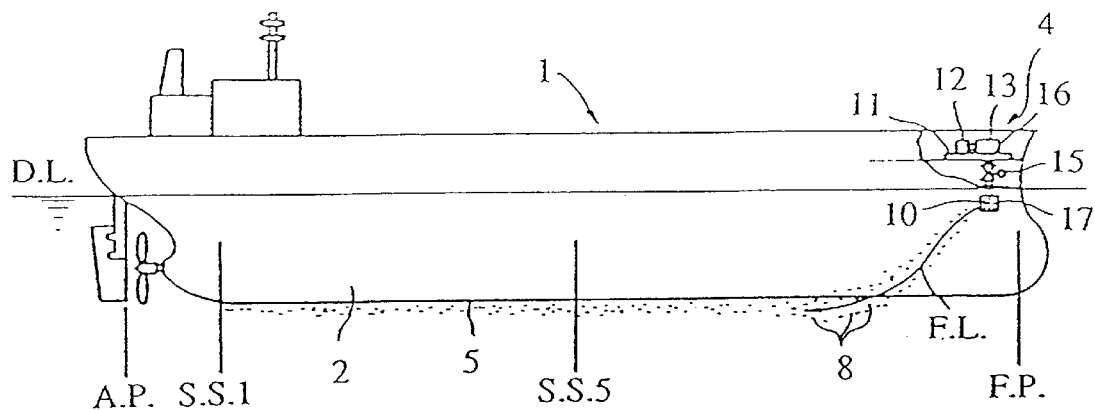
FIGS. 21A and 21B respectively show a side view and a plan view of an embodiment of the frictional-resistance reducing ship in accordance with the present invention.
Figure 21B:
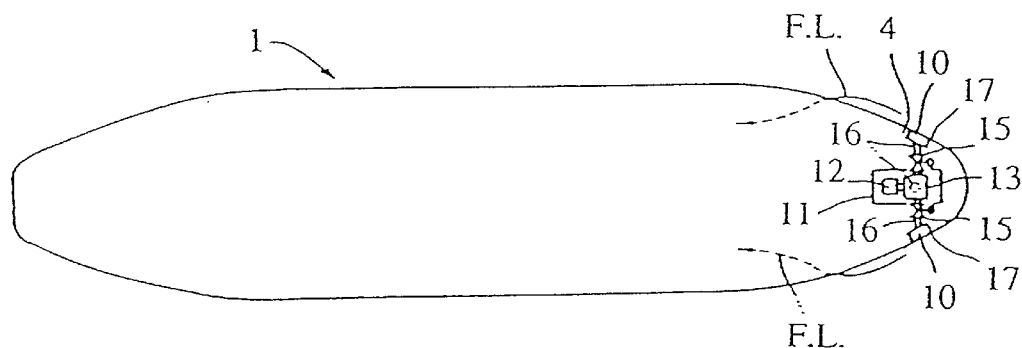

FIGS. 21A and 21B show an embodiment of the frictional-resistance reducing ship to which the method for reducing frictional-resistance according to the present invention is applied. A pressurized air ejection port 10 is provided at either side of the hull 2, in the stem portion 4, at a position corresponding to the stream lines F.L. directed toward the ship's bottom, and at the position where the static head is smallest (i.e., a position slightly below the draw line D.L.), and where the static pressure is low. The position of the air ejection port 10 is determined, based on the distribution of the void fraction obtained as explained above, such that it corresponds to the stream line which can produce a high void fraction effective to reduce frictional-resistance.

Onto a base 11 at the stem portion 4 of the hull 2 is mounted a blower 13 driven by a motor 12 as a pressurized air supply. An air line 16 with a flow control valve 15 extends from the discharge port of the blower 13 and is divided into right and left sides, the distal ends thereof being respectively connected to an air ejecting device 17 including the micro-air-bubble ejection port 10.

Figure 22:
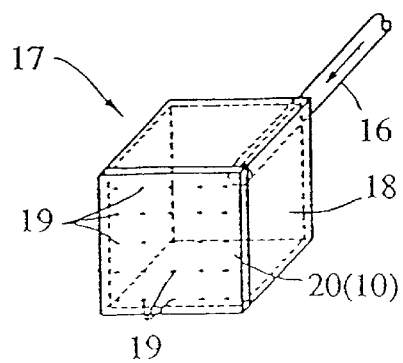
FIG. 22 shows a perspective view of an example of the air ejecting unit including an air ejection port.

The air ejecting device 17 includes, as shown in FIG. 22, a sea chest 18 formed in a box shape, the front surface of which is open, and a porous plate 20 provided at the front opening of the sea chest 18, the porous plate having a plurality of pores 19, arranged in columns and rows at predetermined pitches, passing through the plate in the thickness direction. Accordingly, in this case, the micro air ejection port 10 is constructed by the porous plate 20 provided at the front side of the sea chest 18. Preferably, for a real ship, the porous plate 20 is made of stainless steel having a thickness of 2–3 mm. The porous plate 20 may also be made of ceramic material or high polymer material.

In the embodiment, the pores 19 formed in the porous plate 20 each has a diameter of 2 mm and are arranged in columns and rows at 5 mm pitches. According to the inventors' research, such a construction is the optimum in order to produce micro-air-bubbles having diameters of about 1 mm at the cruising speed of a typical ship. However, it may be possible to set the pitches of the pores 19 in the range of 2.5–5 times the diameter of the pores. The reason the diameter of the air bubble (about 1 mm) becomes smaller than that of the pore 19 (about 2 mm) is the shear effects of the stream against the air bubble. The fact that such a phenomenon has been recognized is also a result of the present invention.

FIG. 23 is a table showing the changes of the sizes of the micro-air-bubbles in the case in which the flow of air (air ejecting speed) and the main flow velocity (cruising velocity) are changed, when ejecting pressurized air through the porous plate 20, that is, the porous plate in which the pores 19, each having a diameter of 2 mm, are arranged in columns and rows at pitches of 5 mm. As can be seen in the table, except for some exceptions, generally, the size of air bubbles produced decreases as the relative speed of water increases and as the air ejecting speed increases. Accordingly, in order to maintain the micro-air-bubbles at an objective size of approximately 1 mm, the air ejecting speed will be decreased as the cruising speed increases, and conversely, the air ejecting speed will be increased as the cruising speed decreases.

While the ship 1 is cruising, starting the motor 12 causes the blower 13 to be driven and pressurized air is introduced in the sea chest 18 via the air lines 16 and is then ejected into water through the pores 19 of the porous plate 20. The pressurized air is thus injected into water as micro-air-bubbles of approximately 1 mm in diameter.

The micro-air-bubbles 8 produced will move under the ship's bottom 5 as they are transferred in the stern direction along both sides of the hull 2 along the boundary layer due to the fact that they are carried by the stream lines F.L. This results in the desired void zone being distributed in the circumference of the hull 2, and thus the frictional-resistance of the hull 2 can be reduced.

In this way, the power required for generating the micro-air-bubbles 8 becomes extremely small since the micro-air-bubble ejection port 10 is provided only at the stem portion 4 of the hull 2 and at a position at which the static pressure is low and the draft is shallow. If it is necessary to change the diameter of the air bubbles 8 in accordance with the cruising speed of the ship 1, it is possible to respond to the situation by controlling the supply flow of the pressurized air by controlling the flow control valve 15.

Figure 24:
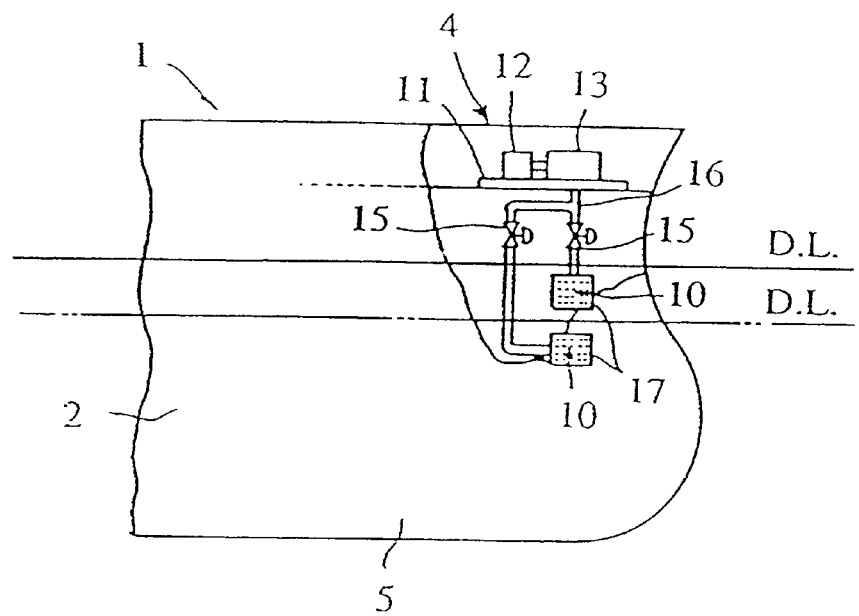
FIG. 24 shows a partial side view of another embodiment for the frictional-resistance reducing ship according to the present invention.

FIG. 24 shows another embodiment for the frictional-resistance reducing ship according to the present invention. In this embodiment, in the ship 1 as shown in FIGS. 11A and 11B, another micro-air-bubble ejection port 10 is further provided below the micro-air-bubble ejecting port 10, and thus, there are two air ejection ports 10 on each side of the hull, arranged in the vertical direction. Also provided at the lower air ejection port 10 is an air ejecting device 17 connected to the air lines 16 via the flow control valve 15, one air ejection port 10 to be used being selectable.

As previously explained, the ship 1 according to the present invention is also characterized in that the micro-air-bubble ejection port 10 is located at a position where the static head is low, that is, adjacent to the draft line D.L. Therefore, it is possible that if the load in the ship 1 changes (e.g., because of a change in the quantity of cargo) the ejection port 10 may be exposed above the water surface as the draft line D.L. goes down. In order to cope with such a situation, in the ship 1 constructed as above, if the draft line D.L. goes down as shown by a chained line in FIG. 24 due to, for example, there being no load, the micro-air-bubbles 8 may be ejected only from the lower ejection port 10 by closing off the flow control valve 15 provided on the air line 16 connected to the upper ejection port 10 and by opening the flow control valve 15 provided on the air line 16 connected to the lower ejection port 10. Thus, it is possible to produce the micro-air-bubbles 8 in response to the change of the draft line D.L. The micro-air-bubble ejection port 10 may of course be provided at more than three positions in the vertical direction.

Figure 25:
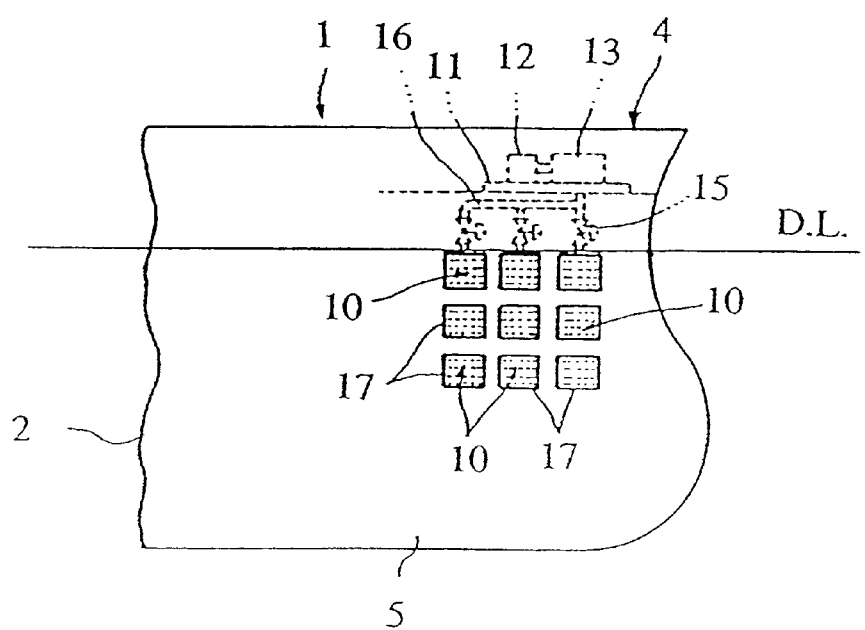
FIG. 25 shows a partial side view of still another embodiment for the frictional-resistance reducing ship according to the present invention.

FIG. 25 shows still another embodiment of the present invention. In this embodiment for the ship 1 shown in FIG. 24, the micro-air-bubble ejection port 10 is additionally provided in the fore-aft directions. To each ejection port 10, 10, . . . , each air line 16 having a flow control valve 15 is connected. rectangular frame is formed with four spacers 22 and the porous plate 20 is mounted on the frame so as to close the open side of the frame. The porous plate 20 is formed with large numbers of pores, each having a diameter of 2 mm, arranged in columns and rows at 5 mm pitches. At the periphery of the frame 22 and at both sides of each air line 16, as shown in FIGS. 26C, 26D, and 26E, flare shapes 23 are formed so that the ejection port 10 and air lines 16 are not influenced by waves.

According to the embodiments, it is possible to apply the present invention to existing ships so long as space for installing the blower 13 and the motor 12 for driving it can be provided.

Although in the embodiments explained above the micro-air-bubble ejection port comprises a porous plate 20, it may be possible to form a sea chest 18, such as shown in FIG. 22, at the air ejection portion and directly perforate the outer skin of the hull 2 to form the pores 19. Again, in the above embodiments, although the porous plate 20 has been described as a flat plate, it may be possible to form the plate 20 so as to fit to the curved outer surface of the hull 2.

As explained in the above examples, the frictional-resistance reducing ship 1 can be attained by forming or mounting the air ejection port(s) 10 in the submerged shallow position at the stem portion 4 of the hull 2. Accordingly, the system can be very simple and thus inexpensive, and can reliably provide the frictional-resistance reducing effects.

In the embodiment above, pressurized air is ejected into water through a plurality of pores since, according to the According to the ship 1 as shown in FIG. 25, it is possible to precisely vary the position for ejecting the micro-air-bubbles in response to not only the change of the draft line D.L. but also to the change in the ship's speed. Thus, even if the position of the optimum stream line F.L. serving the optimum frictional-resistance reducing effect changes due to the change of the cruising speed, it is possible to cope with such situations by selecting the appropriate ejection port(s) 10 arranged in the fore-aft directions. The selection of each ejection port 10 is attained by an opening/closing operation of the flow control valves 15, and these operations of valves 15 may be automatically controlled in response to cruising speed.

FIGS. 26A to 26E show another embodiment of the micro-air-bubble ejection port 10. In the embodiments above, the ejection ports 10 have been explained as being pre-installed, that is, they were installed during the construction of the ship. In contrast, in this embodiment, the micro-air-ejection port 10 is retrofitted to the outer surface of the hull 2.

Figure 26A:
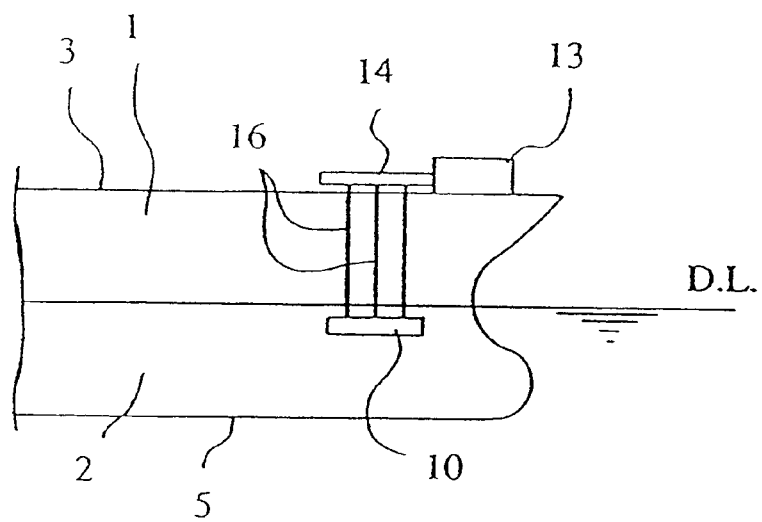
FIGS. 26A through 26E show still another embodiment for the frictional-resistance reducing ship according to the present invention.

As shown in FIG. 26A, an air supplying pipe 14 extends on a deck 3 of the hull 2 from the blower 13, and air lines 16 extending from the air supplying pipe 14 are connected to the ejection port 10. The air lines 16 are pliable, and this permits them to be mounted along the curved side surface of hull 2.

Figure 26B:
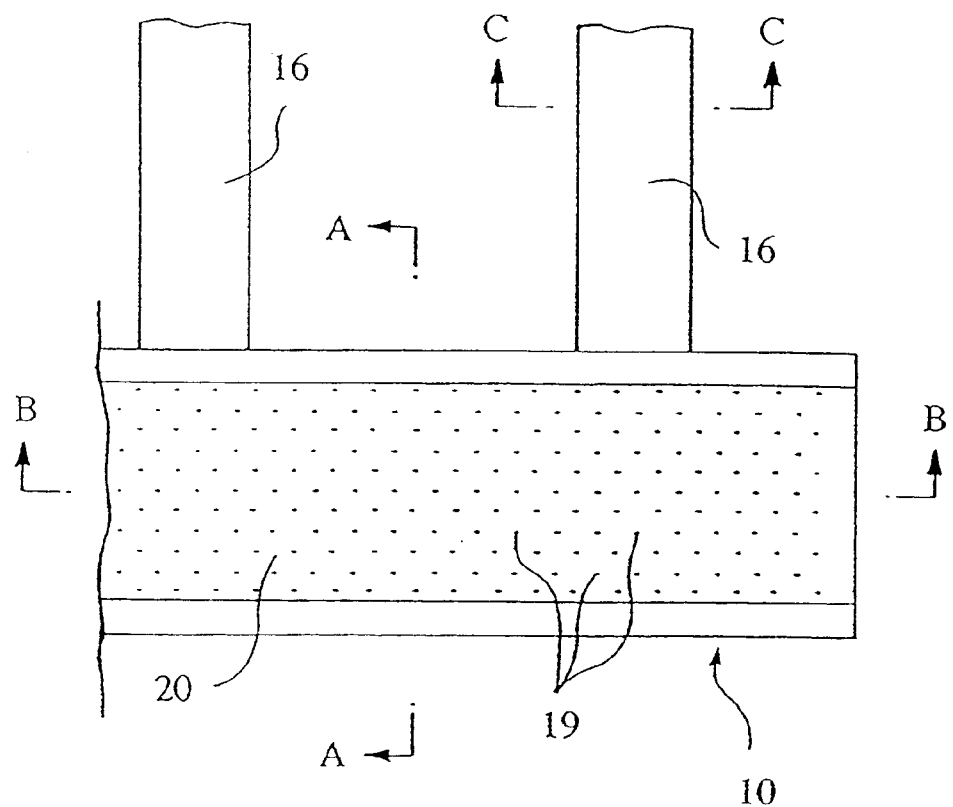
Figure 26C:
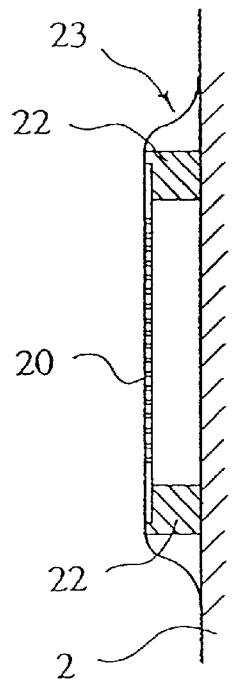
Figure 26D:
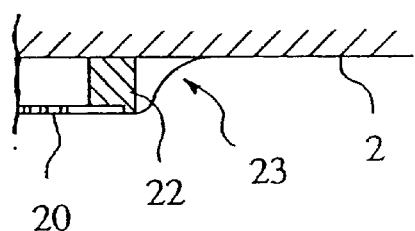
Figure 26E:
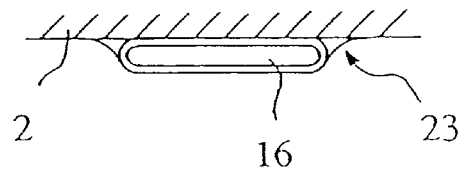

FIG. 26C shows a sectional view taken along the line A—A in FIG. 26B, and FIG. 26D shows a sectional view taken along the line B—B in FIG. 26B. In FIG. 26C, the numeral 22 indicates steel spacers welded on the outer skin of the hull. A inventors' research at present, this method is recognized to be best for producing the air bubbles each having a diameter of about 1 mm. However, it should be noted that the present invention does not intend to limit the means for generating air bubbles to the above. For instance, it may be possible to use other methods for obtaining the desired micro-air-bubbles using a conventional slit-type or nozzle-type air ejecting device. In such a case, it may be possible to utilize such slit-type or nozzle-type air ejecting device as an air bubble generating means.

Figure 27A:
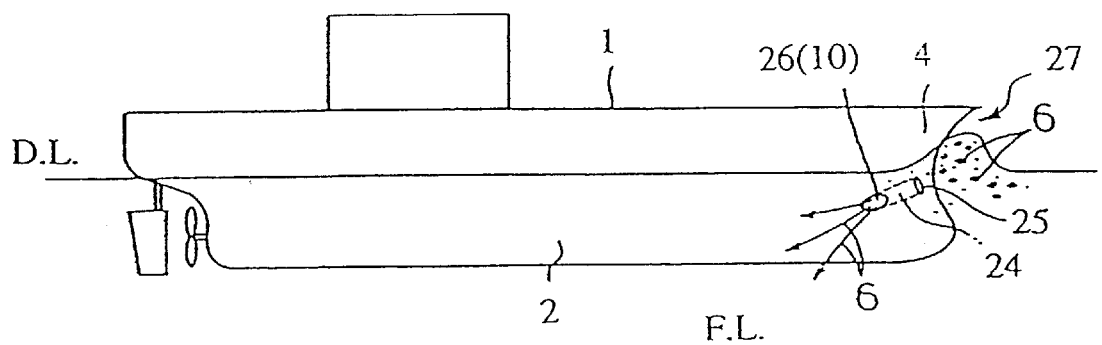
FIGS. 27A and 27B show yet another embodiment for the frictional-resistance reducing ship according to the present invention.
Figure 27B:
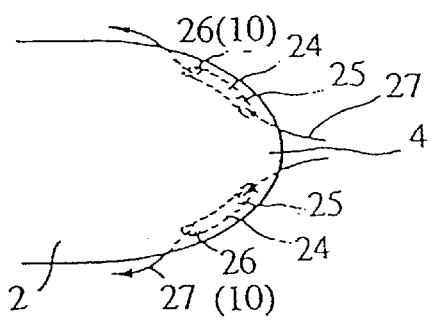

FIGS. 27A and 27B show still another embodiment for the frictional-resistance reducing ship according to the present invention. According to this embodiment, the air ejection port 10 such as is explained in the embodiments above is constituted by a discharge 26 of a wave conduit 24.

As shown in FIGS. 27A and 27B, the wave conduit 24 takes in a stem-broken-wave, produced at the stem area 4 of the hull 2, from an intake 25 opened adjacent to the end part of the stem portion at the submerged portion of the hull 2 and discharges the taken-in stem-broken-wave from the discharge 26 opened at the stem portion in the rear of the intake 25. The wave conduit 24 is a conduit formed in a pathway or a pipe passing through a part of the hull 2.

The discharge 26 is located at a position lower than the intake 25, and thus, the wave conduit 24 is downwardly and obliquely oriented in the direction to discharge opening 26 from the intake 25. The discharge opening 26, that is, the air ejection port 10, opens in the desired stream line F.L. which goes, from the stem portion 4, downward and under the ship's bottom along the surface of the hull 2. Accordingly, the inclination of the wave conduit approximately coincides with the direction of the stream line F.L.

When the ship 1 cruises, sea water in the front of the stem portion 4 crashes against the front side of the stem, causing the stem-broken-wave 27 to be produced. In the ship 1 according to this embodiment, a part of the stem-broken-wave 27 produced by crashing against the front surface of the stem portion 4 is taken into the wave conduit 24 provided at both sides of the stem portion 4, from the intake 25 and is discharged from the discharge opening 26. The discharged stem-broken-wave 27 will then go under the ship's bottom from both sides along the submerged surface of the hull 2, by being carried by the stream line F.L.

The stem-broken-wave 27 includes large numbers of micro-air-bubbles. Therefore, the micro-air-bubbles contained in the stem-broken-wave 27 will go under the ship's bottom from both sides along the submerged surface of the hull 2, by being carried by the stream line F.L., and this leads to reduction in the cruising frictional-resistance of the ship 1 in the same way as the embodiments mentioned previously.

As to the ship 1 according to this embodiment, the quantity of the micro-air-bubbles available will be smaller than that obtained by the previously explained embodiments which utilize an air supplying source such as a blower. Therefore, the frictional-resistance reducing effect provided by the ship 1 may be smaller than that obtained from the ship having the air source. However, due to the freedom from the air supplying source, the power for generating air bubbles is not required, and thus, a power reduction effect can be obtained.

Figure 28A:
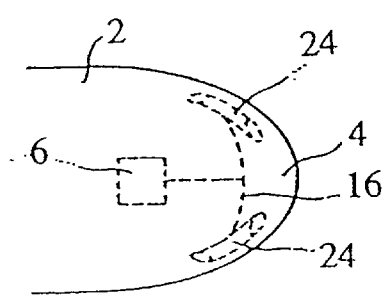
FIGS. 28A and 28B show an improved embodiment for the frictional-resistance reducing ship shown in FIGS. 27A and 27B.
Figure 28B:
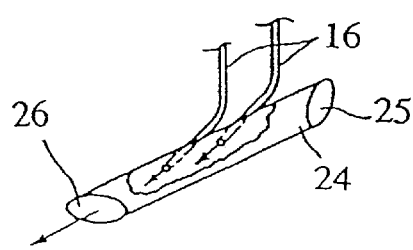

FIGS. 28A and 28B show an improved embodiment for the frictional-resistance reducing ship shown in FIGS. 27A and 27B. In this embodiment, each distal end of the air lines 16 extending from the air supply 6 is opened inside the wave conduit 24 in the middle way thereof. The open end of the air line 16 is oriented, at least before its joining to the wave conduit 24, such that the air line 16 is directed to the discharge 26 of the wave conduit.

According to this embodiment, it is possible to mix pressurized air with the stem-broken-wave taken into the wave conduit 24. Therefore, it is possible to promote the flow of the stream of the stem-broken-wave 27 in the wave conduit 24 by means of ejection force of the pressurized air, thus enabling the micro-air-bubbles to be effectively transferred in the direction along the stream line F.L. Thus, this embodiment is effective, in particular, in the case wherein the desirable stream line F.L. does not occur due to the low cruising speed of ship 1 and wherein the quantity of the micro-air bubbles produced by the stem-broken-wave is insufficient.

In addition, according to this embodiment, the ejected air into the wave conduit 24 may be separated by the water stream flowing inside the wave conduit 24, and then a part of the separated air may be turned into micro-bubbles, whereby the quantity of the micro-bubbles carried by the stream line F.L. may be replenished.

FIGS. 28A and 28B show the embodiment in which one wave conduit 24 is formed at either side of the port side and the starboard of the hull 2. It should be noted, however, that it is also possible to form and arrange a plurality of wave conduits 24 in the vertical direction or the fore-aft directions, or both directions thereof.

In the embodiments above, the present invention has been explained as it is to be applied to a container ship 1. However, it is apparent that the present invention is applicable to any other hull, and can also achieve the same functions and advantages as the above embodiments.

What is claimed is:

1. A method for reducing frictional-resistance at a hull (2) of a ship (1), characterized in that said method comprising a step of ejecting micro-bubbles (8) each having an average diameter which is set at approximately 1 mm, wherein said micro-bubbles (8) are ejected into water from a position adjacent to the starting point of a desired stream line (F.L.) of water and from a position where the static pressure is low, said stream line (F.L.) being directed, from the submerged shallow position at a stein portion (4) of said ship's hull (2), to the ship's bottom (5) along both side surfaces of said ship's hull (2), so that said ejected micro-bubbles (8) are carried to said ship's bottom (5) along said strewn line (F.L.), whereby said micro-bubbles (8) are distributed at least a part of the circumferential area of said submerged portion of said hull (2), thus reducing frictional-resistance at said hull (2) of said ship (1) while cruising.

2. The method according to claim 1, wherein the hull is divided into ten square stations (s.s.1–s.s.10) and said microbubbles (8) are ejected into water from an area between a midpoint of the eighth one of the square stations (s.s.8) and the tenth one of the square stations (s.s.10) in the fore-aft direction of the hull (2) and within a depth of $\frac{2}{3}$ of the draft line (D.L.) in said submerged portion of said hull (2).

3. The method according to claim 1, wherein, said size of said micro-bubbles (8) is maintained as the cruising speed of said ship's hull (2) varies, by changing the ejecting speed of said micro-bubbles (8) in response to said cruising speed.

4. A frictional-resistance reducing ship (1), said ship having a hull (2), stem portion (4), and bottom (5), characterized in that said ship (1) comprises a micro-air-bubble ejection port (10) located adjacent to the starting point of a stream line (F.L.) of water and located at a position where the static pressure is low, said stream line (F.L.) being directed to said bottom (5) along the surfaces of both sides of said hull (2) from the submerged shallow position at said stem portion (4) of said hull (2), and said micro-air-bubble ejection port (10) being connected with a pressure air source (13) via an air line (16), wherein micro-bubbles, each having an average diameter which is set at approximately 1 mm, are ejected from said micro-air-bubble election port (10).

5. The frictional-resistance reducing ship according to claim 4, wherein the hull is divided into ten square stations (s.s.1–s.s.10) and said micro-air-bubble ejection port (10) is located in an area between a midpoint of an eighth square station (s.s.8) and a tenth square station (s.s.10) in the fore-aft direction of said hull (2) and within a depth of $2/3$ of the draft line (D.L.) in said submerged portion of said hull (2).

6. The frictional-resistance reducing ship, according to claim 5, wherein said micro-air-bubble ejection port (10) includes a plurality of areas in the vertical direction of said hull (2), each of said areas to be used selectable by controlling a flow control valve (15) provided on said air line (16).

7. The frictional-resistance reducing ship according to claim 6, wherein said micro-air-bubble ejection port (10) includes a plurality of areas in the fore-aft direction of said hull (2), each of said areas to be used selectable by controlling a flow control valve (15) provided on said air line (16).

8. The frictional-resistance reducing ship according to claim 4, wherein said micro-air-bubble ejection port (10) includes a plurality of pores (19) which are arranged in columns and rows.

9. The frictional-resistance reducing ship according to claim 8, wherein said pores (19) are directly formed on an outer skin of said hull (2).

10. The frictional-resistance reducing ship according to claim 8, wherein said pores (19) are formed on a plate which is integrated with said outer skin.

11. The frictional-resistance reducing ship according to claim 8, wherein said pores (19) are formed on a plate which is fixed to said outer skin.

12. A frictional-resistance reducing ship (1), said ship having a hull (2), stem portion (4), and bottom (5), characterized in that said ship (1) comprises a wave conduit (24) for taking in a stem-broken-wave (27) produced at said stem area (4) of a ship while cruising, said wave conduit (24) comprising an intake (25) opened forward for taking in said stem-broken-wave (27) and a discharge opening (26) opened rearward for discharging said stem-broken-wave (27) taken in, said intake (25) being located adjacent to the starting point of a stream line (F.L.) of water and located at the position where the static pressure is low, said stream line (F.L.) being directed to said bottom (5) along the surfaces of both sides of said hull (2) from the submerged shallow position at said stem portion (4) of said hull (2), and said wave conduit (24) being downward obliquely oriented so as to direct said stem-broken-wave (27) taken to the flow direction of said stream line (F.L.) in order to place said stem-broken-wave (27) on said stream line (F.L.).

13. The frictional-resistance reducing ship according to claim 12, wherein an air supply opening, for discharging pressurized air into said wave conduit (24), is provided in said wave conduit (24).

14. The frictional-resistance reducing ship according to claim 12, wherein the axis of said supplying opening is inclined in the direction of said discharge opening.

\* \* \* \* \*

UNITED STATES PATENT AND TRADEMARK OFFICE
CERTIFICATE OF CORRECTION

PATENT NO. : 6,186,085 B1
DATED : February 13, 2001
INVENTOR(S) : Kato et al.

It is certified that error appears in the above-identified patent and that said Letters Patent is hereby corrected as shown below:

Column 6,
Equation 1, delete "$v_L^{1/2}$", and insert -- $v_L^{1/2}$ --.
Equation 2, delete "$v_L^{1/2}$", and insert -- $v_L^{1/2}$ --.
Equation 3, delete "$v_L^{1/2}$", and insert -- $v_L^{1/2}$ --.

Line 28, delete "X", and insert -- x --.
Equation 8, after "e", delete -- ˉ --. (superscript minus sign).

Column 11,
Line 64, delete "Z$_s$" and insert -- z$_s$ --.

Column 13,
Equation 14, delete "≡", and insert -- ≅ --.

Equation 15, delete "u'$_L$", and insert -- u$_L$' --.

Column 14,
Line 3, after "gradient", insert -- . -- (period).
Equation 23, delete "$k_2^2$", and insert -- k$_2^2$ --.
Equation 24, delete "$\lambda_L^2$", and insert -- $\lambda_L^2$ --.

Column 15,
Equation 29, delete "$\alpha_m^{2/3}$", and insert -- $\alpha_m^{2/3}$ --.

Column 16,
Equation 33, delete "e$^{k}$", and insert -- e$^{k}$ --.
Equation 33, delete "$K_1^2$" (first occurrence, and insert -- K$_1^2$ --.

Equation 33, delete "$K_1^2$" (second occurrence, and insert -- K$_1^2$ --.

Column 19,
Line 12, delete "the-direction", and insert -- the direction --.

Column 22,
Section beginning at line 11, "rectangular frame..." and ending at line 39 "...according to the", should be moved to Column 23, line 3, after -- of the hull. A --.

UNITED STATES PATENT AND TRADEMARK OFFICE
CERTIFICATE OF CORRECTION

PATENT NO. : 6,186,085 B1
DATED : February 13, 2001
INVENTOR(S) : Kato et al.

It is certified that error appears in the above-identified patent and that said Letters Patent is hereby corrected as shown below:

Column 23,
Line 23, after "charge", insert -- opening --.
Line 25, after "discharge", insert -- opening --.

Column 24,
Line 4, after "discharge", insert -- opening --.

Column 25,
Line 13, (claim 4), delete "election", and insert -- ejection --.

Signed and Sealed this

Twenty-seventh Day of November, 2001

Attest:

*Nicholas P. Godici*

NICHOLAS P. GODICI
*Attesting Officer*   *Acting Director of the United States Patent and Trademark Office*